(12) United States Patent
Wang et al.

(10) Patent No.: US 11,789,232 B2
(45) Date of Patent: Oct. 17, 2023

(54) OPTICAL IMAGING LENS ASSEMBLY AND ELECTRONIC DEVICE INCLUDING FIVE LENSES OF +−+−+, +−−−+ OR +−++REFRACTIVE POWERS

(71) Applicant: Zhejiang Sunny Optical Co., Ltd, Ningbo (CN)

(72) Inventors: Xinquan Wang, Ningbo (CN); Fujian Dai, Ningbo (CN); Liefeng Zhao, Ningbo (CN)

(73) Assignee: Zhejiang Sunny Optical Co. Ltd.

( * ) Notice: Subject to any disclaimer, the term of this patent is extended or adjusted under 35 U.S.C. 154(b) by 406 days.

(21) Appl. No.: 16/891,807

(22) Filed: Jun. 3, 2020

(65) Prior Publication Data
US 2020/0409036 A1    Dec. 31, 2020

(30) Foreign Application Priority Data

Jun. 25, 2019  (CN) .......................... 201910554380.6

(51) Int. Cl.
*G02B 9/60* (2006.01)
*G02B 13/00* (2006.01)

(52) U.S. Cl.
CPC .......... *G02B 9/60* (2013.01); *G02B 13/0045* (2013.01)

(58) Field of Classification Search
CPC .............................. G02B 9/60; G02B 13/0045
See application file for complete search history.

(56) References Cited

U.S. PATENT DOCUMENTS

| | | | |
|---|---|---|---|
| 9,568,712 B2 | 2/2017 | Dror et al. | |
| 2018/0059370 A1 | 3/2018 | Chen et al. | |
| 2018/0172963 A1 | 6/2018 | Kim et al. | |
| 2018/0335610 A1* | 11/2018 | Chen | G02B 27/0025 |
| 2020/0285025 A1* | 9/2020 | Jhang | G02B 13/0045 |
| 2021/0063688 A1* | 3/2021 | Shin | G03B 30/00 |
| 2021/0382207 A1* | 12/2021 | Lee | G02B 9/60 |
| 2022/0350115 A1* | 11/2022 | Yoo | G02B 3/0062 |

* cited by examiner

*Primary Examiner* — Wen Huang
(74) *Attorney, Agent, or Firm* — Barnes & Thornburg LLP

(57) ABSTRACT

The present disclosure provides an optical imaging lens assembly and an electronic device. The optical imaging lens assembly includes, sequentially from an object side to an image side along an optical axis, a first lens having a positive refractive power, and an object-side surface of the first lens being a convex surface; a second lens having a negative refractive power; a third lens having a refractive power; a fourth lens having a refractive power; and a fifth lens having a positive refractive power, and an image-side surface of the fifth lens being a concave surface. Here, half of a maximal field-of-view Semi-FOV of the optical imaging lens assembly satisfies Semi-FOV<15°.

19 Claims, 8 Drawing Sheets

OPTICAL IMAGING LENS ASSEMBLY AND ELECTRONIC DEVICE INCLUDING FIVE LENSES OF +−+−+, +−−−+ OR +−++REFRACTIVE POWERS

CROSS-REFERENCE TO RELATED APPLICATION

This application claims benefit of priority to Chinese Patent Application No. 201910554380.6 filed on Jun. 25, 2019 before the China National Intellectual Property Administration, the entire disclosure of which is incorporated herein by reference in its entity.

TECHNICAL FIELD

Examples of the present disclosure relate to the field of optical components, and specifically, relate to an optical imaging lens assembly and an electronic device.

BACKGROUND

In recent years, camera lens assemblies based on CMOS and CCD have been widely used in various fields, especially in the field of intelligent mobile devices. Commonly camera lens assemblies are not only used as imaging devices with general angle of view, but also extended to telephoto imaging devices with high-pixel to obtain high-quality telephoto images. However, the imaging device equipped with the traditional optical lens assembly has a large angle of view, which makes it difficult to meet the requirements for high-quality telephoto imaging.

SUMMARY

In view of the technical problems in the prior art, the present disclosure provides an optical imaging lens assembly and an electronic device.

In one aspect, the present disclosure provides an optical imaging lens assembly which includes, sequentially from an object side to an image side along an optical axis, a first lens having a positive refractive power, and an object-side surface of the first lens being a convex surface; a second lens having a negative refractive power; a third lens having a refractive power; a fourth lens having a refractive power; and a fifth lens having a positive refractive power and an image-side surface of the fifth lens being a concave surface, wherein half of a maximal field-of-view Semi-FOV of the optical imaging lens assembly satisfies Semi-FOV<15°.

According to an embodiment of the present disclosure, a center thickness CT1 of the first lens along the optical axis and an edge thickness ET1 of the first lens satisfy: $0.3<ET1/CT1<1$.

According to an embodiment of the present disclosure, a distance TTL along the optical axis from the object-side surface of the first lens to an imaging plane of the optical imaging lens assembly, a total effective focal length f of the optical imaging lens assembly, and half of the maximal field-of-view Semi-FOV of the optical imaging lens assembly satisfy: $TTL/f+\tan(Semi\text{-}FOV)<1.2$.

According to an embodiment of the present disclosure, an effective focal length f1 of the first lens and a total effective focal length f of the optical imaging lens assembly satisfy: $0.2<f1/f<0.7$.

According to an embodiment of the present disclosure, a combined focal length f23 of the second lens and the third lens and a combined focal length f2345 of the second lens, the third lens, the fourth lens, and the fifth lens satisfy: $0.2<f23/f2345<1.2$.

According to an embodiment of the present disclosure, a radius of curvature R1 of the object-side surface of the first lens and an effective focal length f1 of the first lens satisfy: $0.3<R1/f1<0.8$.

According to an embodiment of the present disclosure, a radius of curvature R9 of an object-side surface of the fifth lens and an effective focal length f5 of the fifth lens satisfy: $0.1<R9/f5<0.6$.

According to an embodiment of the present disclosure, a radius of curvature R3 of an object-side surface of the second lens and a radius of curvature R1 of the object-side surface of the first lens satisfy: $0.2<R3/(R3-R1)<0.7$.

According to an embodiment of the present disclosure, a radius of curvature R5 of an object-side surface of the third lens and a radius of curvature R6 of an image-side surface of the third lens satisfy: $0.5<R6/|R5|<2$.

According to an embodiment of the present disclosure, a radius of curvature R10 of the image-side surface of the fifth lens and a total effective focal length f of the optical imaging lens assembly satisfy: $0.2<R10/f<1.7$.

According to an embodiment of the present disclosure, a center thickness CT3 of the third lens along the optical axis, a center thickness CT4 of the fourth lens along the optical axis, and a center thickness CT5 of the fifth lens along the optical axis satisfy: $0.4<CT4/(CT3+CT5)<0.9$.

According to an embodiment of the present disclosure, a center thickness CT2 of the second lens along the optical axis and a sum of the air intervals ΣAT along the optical axis of each two adjacent lenses of the first lens to the fifth lens satisfy: $0.3<CT2/\Sigma AT<0.9$.

According to an embodiment of the present disclosure, an edge thickness ET3 of the third lens and an edge thickness ET4 of the fourth lens satisfy: $0.2<ET3/(ET3+ET4)<0.7$.

According to an embodiment of the present disclosure, a projection distance SAG21 along the optical axis between an intersection of an object-side surface of the second lens and the optical axis and an apex of an effective radius of the object-side surface of the second lens, a projection distance SAG22 along the optical axis between an intersection of an image-side surface of the second lens and the optical axis and an apex of an effective radius of the image-side surface of the second lens, and a maximum effective radius DT22 of the image-side surface of the second lens satisfy: $0.1<(|SAG22|-SAG21)/DT22<0.6$.

In another aspect, the present disclosure provides an optical imaging lens assembly which includes, sequentially from an object side to an image side along an optical axis, a first lens having a positive refractive power, and an object-side surface of the first lens being a convex surface; a second lens having a negative refractive power; a third lens having a refractive power; a fourth lens having a refractive power; and a fifth lens having a positive refractive power and an image-side surface of the fifth lens being a concave surface, wherein a center thickness CT1 of the first lens along the optical axis and an edge thickness ET1 of the first lens satisfy: $0.3<ET1/CT1<1$.

According to an embodiment of the present disclosure, a distance TTL along the optical axis from the object-side surface of the first lens to an imaging plane of the optical imaging lens assembly, a total effective focal length f of the optical imaging lens assembly, and half of a maximal field-of-view Semi-FOV of the optical imaging lens assembly satisfy: $TTL/f+\tan(Semi\text{-}FOV)<1.2$.

According to an embodiment of the present disclosure, an effective focal length f1 of the first lens and a total effective focal length f of the optical imaging lens assembly satisfy: 0.2<f1/f<0.7.

According to an embodiment of the present disclosure, a combined focal length f23 of the second lens and the third lens and a combined focal length f2345 of the second lens, the third lens, the fourth lens, and the fifth lens satisfy: 0.2<f23/f2345<1.2.

According to an embodiment of the present disclosure, a radius of curvature R1 of the object-side surface of the first lens and an effective focal length f1 of the first lens satisfy: 0.3<R1/f1<0.8.

According to an embodiment of the present disclosure, a radius of curvature R9 of an object-side surface of the fifth lens and an effective focal length f5 of the fifth lens satisfy: 0.1<R9/f5<0.6.

According to an embodiment of the present disclosure, a radius of curvature R3 of an object-side surface of the second lens and a radius of curvature R1 of the object-side surface of the first lens satisfy: 0.2<R3/(R3−R1)<0.7.

According to an embodiment of the present disclosure, a radius of curvature R5 of an object-side surface of the third lens and a radius of curvature R6 of an image-side surface of the third lens satisfy: 0.5<R6/|R5|<2.

According to an embodiment of the present disclosure, a radius of curvature R10 of the image-side surface of the fifth lens and a total effective focal length f of the optical imaging lens assembly satisfy: 0.2<R10/f<1.7.

According to an embodiment of the present disclosure, a center thickness CT3 of the third lens along the optical axis, a center thickness CT4 of the fourth lens along the optical axis, and a center thickness CT5 of the fifth lens along the optical axis satisfy: 0.4<CT4/(CT3+CT5)<0.9.

According to an embodiment of the present disclosure, a center thickness CT2 of the second lens along the optical axis and a sum of the air intervals ΣAT along the optical axis of each two adjacent lenses of the first lens to the fifth lens satisfy: 0.3<CT2/ΣAT<0.9.

According to an embodiment of the present disclosure, an edge thickness ET3 of the third lens and an edge thickness ET4 of the fourth lens satisfy: 0.2<ET3/(ET3+ET4)<0.7.

According to an embodiment of the present disclosure, a projection distance SAG21 along the optical axis between an intersection of an object-side surface of the second lens and the optical axis and an apex of an effective radius of the object-side surface of the second lens, a projection distance SAG22 along the optical axis between an intersection of an image-side surface of the second lens and the optical axis and an apex of an effective radius of the image-side surface of the second lens, and a maximum effective radius DT22 of the image-side surface of the second lens satisfy: 0.1<(|SAG22|−SAG21)/DT22<0.6.

In yet another aspect, the present disclosure provides an electronic device including the above optical imaging lens assembly.

The optical imaging lens assembly provided in the disclosure employs five lenses. By optimally configuring the refractive power of each lens and the surface shape to match each other reasonably and configuring a smaller half of a maximal field-of-view, the optical imaging lens assembly may perform a high-definition imaging of distant scenes while ensuring the miniaturization of the system to meet the requirements of high-quality telephoto imaging.

BRIEF DESCRIPTION OF THE DRAWINGS

Other features, objects, and advantages of the present disclosure will become more apparent from the following detailed description of the non-limiting embodiments with reference to the accompanying drawings. In the accompanying drawings.

DETAILED DESCRIPTION OF EMBODIMENTS

Figure 1:
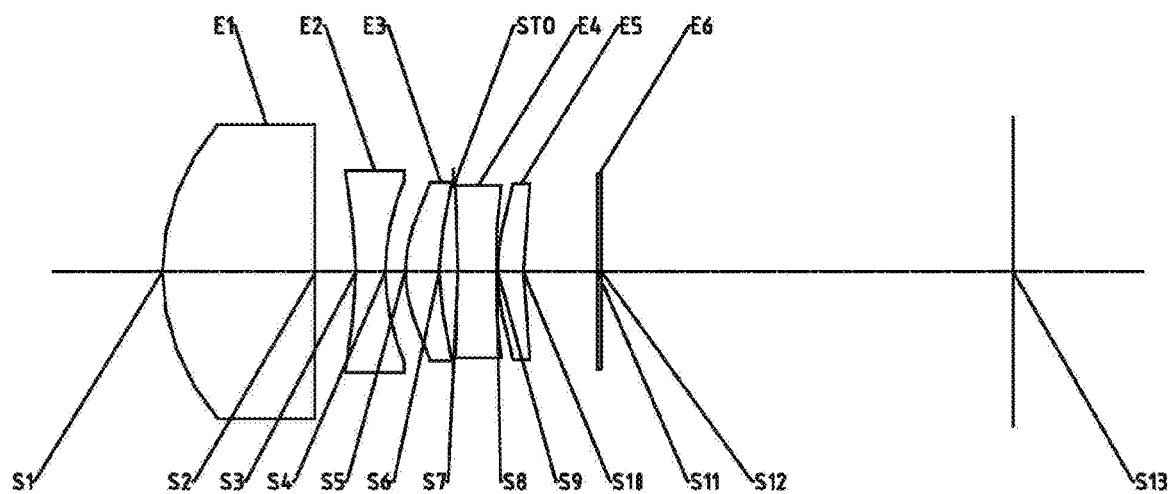
FIG. 1 illustrates a schematic structural view of an optical imaging lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been slightly exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the subject is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

At present, when a camera lens assembly based on CMOS and CCD is used as an imaging device of a smart mobile device, the angle of view of the camera lens assembly is generally large. Under the requirement of system miniaturization, the camera lens assembly is difficult to meet the requirements of high-quality telephoto.

In view of the above problems, the present disclosure provides an optical imaging lens assembly which includes, sequentially from an object side to an image side along an optical axis, a first lens having a positive refractive power, and an object-side surface of the first lens being a convex surface; a second lens having a negative refractive power; a third lens having a refractive power; a fourth lens having a refractive power; and a fifth lens having a positive refractive power and an image-side surface of the fifth lens being a concave surface, wherein, half of a maximal field-of-view Semi-FOV of the optical imaging lens assembly satisfies Semi-FOV<15°.

Specifically, the optical imaging lens assembly provided in the present disclosure includes a first lens, a second lens, a third lens, a fourth lens, and a fifth lens. The first lens having a positive refractive power is helpful to shorten the overall length of the optical system, thereby achieving miniaturization of the lens module. The object-side surface of the first lens is a convex surface, which is beneficial to reduce the spherical aberration of the optical system, thereby improving the imaging quality. The second lens matched with the first lens has a negative refractive power, which is beneficial to further compress the overall length of the optical system, thereby improving the telephoto ratio of the optical system. Both of the third lens and the fourth lens have refractive power and cooperate with each other to help adjust the change of the optical path of each field of view, thereby improving the imaging quality of the optical system. The fifth lens having a positive refractive power with the image-side surface thereof being concave is helpful to reduce the optical effective diameter of the lens and shorten the overall length of the optical system, thereby realizing the miniaturization of the lens module. Moreover, half of a maximal field-of-view of the optical imaging lens assembly is less than 15 degrees. A smaller field-of-view is conducive to capturing a high-definition image of distant scenes by the optical system, thus meeting the requirements of high-quality telephoto imaging.

According to an embodiment of the present disclosure, a center thickness CT1 of the first lens along the optical axis and an edge thickness ET1 of the first lens satisfy: 0.3<ET1/CT1<1. Reasonably setting the ratio between the edge thickness and the center thickness of the lens is helpful to ensure that the optical system obtains high-quality telephoto images, and at the same time makes the lens processing relatively easy, so as to achieve a relative balance between the high-quality telephoto imaging of the optical system and the lens processing technology requirements.

According to an embodiment of the present disclosure, a distance TTL along the optical axis from the object-side surface of the first lens to an imaging plane of the optical imaging lens assembly, a total effective focal length f of the optical imaging lens assembly, and half of the maximal field-of-view Semi-FOV of the optical imaging lens assembly satisfy: TTL/f+tan(Semi-FOV)<1.2, for example, TTL/f+tan(Semi-FOV)<1.185. Reasonably setting the relationship among TTL, f and Semi-FOV is conducive to the optical system to achieve a better balance among the high-quality telephoto imaging, the shorter overall system length and the miniaturization of the lens module.

According to an embodiment of the present disclosure, an effective focal length f1 of the first lens and a total effective focal length f of the optical imaging lens assembly satisfy: 0.2<f1/f<0.7, for example, 0.36<f1/f<0.48. Reasonably controlling the proportional relationship between the effective focal length of the first lens and the total effective focal length of the optical imaging lens assembly is beneficial to obtain a balance between the short overall length of the optical system and the high telephoto ratio, and thus ensures that the optical system has a good imaging quality.

According to an embodiment of the present disclosure, a combined focal length f23 of the second lens and the third lens and a combined focal length f2345 of the second lens, the third lens, the fourth lens, and the fifth lens satisfy: $0.2<f23/f2345<1.2$. Reasonably setting the proportional relationship between the above two combined focal lengths is beneficial to shorten the overall length of the optical system, thereby achieving the miniaturization of the lens module.

According to an embodiment of the present disclosure, a radius of curvature R1 of the object-side surface of the first lens and an effective focal length f1 of the first lens satisfy: $0.3<R1/f1<0.8$, for example, $0.53<R1/f1<0.8$. Reasonably controlling the proportional relationship between the radius of curvature of the object-side surface of the first lens and the effective focal length of the first lens is conducive to improving the telephoto ratio of the optical system, reducing the spherical aberration of the system, improving the telephoto imaging quality, and making the lens have a good processing and manufacturing manufacturability.

According to an embodiment of the present disclosure, a radius of curvature R9 of an object-side surface of the fifth lens and an effective focal length f5 of the fifth lens satisfy: $0.1<R9/f5<0.6$. Reasonably controlling the proportional relationship between the radius of curvature of the object-side surface of the fifth lens and the effective focal length of the fifth lens is beneficial to shorten the overall length of the optical system and reduce the optical effective diameter of the lens, thereby achieving the miniaturization of the lens module.

According to an embodiment of the present disclosure, a radius of curvature R3 of an object-side surface of the second lens and a radius of curvature R1 of the object-side surface of the first lens satisfy: $0.2<R3/(R3-R1)<0.7$, for example, $0.48<R3/(R3-R1)<0.59$. Reasonably setting the mutual relationship between R1 and R3 is beneficial to the reasonable distribution of refractive power of the lens, and to avoid the lens from being difficult to manufacture due to excessive concentration of the refractive power or excessive bending of the lens surface.

According to an embodiment of the present disclosure, a radius of curvature R5 of an object-side surface of the third lens and a radius of curvature R6 of an image-side surface of the third lens satisfy: $0.5<R6/|R5|<2$, for example, $0.5<R6/|R5|<1.7$. Controlling the ratio of R6 to |R5| within a reasonable data range is beneficial to reduce the astigmatic of the optical system, thereby improving the imaging quality.

According to an embodiment of the present disclosure, a radius of curvature R10 of the image-side surface of the fifth lens and a total effective focal length f of the optical imaging lens assembly satisfy: $0.2<R10/f<1.7$, for example, $0.2<R10/f<1.3$. Reasonably controlling the proportional relationship between the radius of curvature of the image-side surface of the fifth lens and the total effective focal length of the optical imaging lens assembly is beneficial to shorten the overall length of the optical system and reduce the effective optical diameter of the lens, avoid an increase in tolerance sensitivity caused by excessive bending of light on the lens surface, thereby achieving the miniaturization of the lens module.

According to an embodiment of the present disclosure, a center thickness CT3 of the third lens along the optical axis, a center thickness CT4 of the fourth lens along the optical axis, and a center thickness CT5 of the fifth lens along the optical axis satisfy: $0.4<CT4/(CT3+CT5)<0.9$. Reasonably setting the relationship among CT3, CT4 and CT5 is conducive to a reasonable distribution of the spatial size of the lens along the optical axis, so that the third lens, the fourth lens and the fifth lens have a better processing and molding manufacturability.

According to an embodiment of the present disclosure, a center thickness CT2 of the second lens along the optical axis and a sum of the air intervals $\Sigma AT$ along the optical axis of each two adjacent lenses of the first lens to the fifth lens satisfy: $0.3<CT2/\Sigma AT<0.9$. Reasonably setting the proportional relationship between CT2 and $\Sigma AT$ is beneficial to the reasonable distribution of the spatial size of each lens along the optical axis, and to avoid problems such as difficulty in manufacturing or high tolerance sensitivity caused by unreasonable spatial size distribution.

According to an embodiment of the present disclosure, an edge thickness ET3 of the third lens and an edge thickness ET4 of the fourth lens satisfy: $0.2<ET3/(ET3+ET4)<0.7$. Reasonably setting the mutual relationship between ET3 and ET4 is beneficial to the second lens and the third lens having a better processing and manufacturing manufacturability.

According to an embodiment of the present disclosure, a projection distance SAG21 along the optical axis between an intersection of an object-side surface of the second lens and the optical axis and an apex of an effective radius of the object-side surface of the second lens, a projection distance SAG22 along the optical axis between an intersection of an image-side surface of the second lens and the optical axis and an apex of an effective radius of the image-side surface of the second lens, and a maximum effective radius DT22 of the image-side surface of the second lens satisfy: $0.1<(|SAG22|-SAG21)/DT22<0.6$. Reasonably setting the mutual relationship among SAG22, SAG21 and DT22 is beneficial to reduce the astigmatic of the optical system and improve the imaging quality of the off-axis field, while ensuring that the second lens has a good processing and manufacturing manufacturability.

In one aspect, the present disclosure provides an electronic device including the above optical imaging lens assembly. That is, the electronic device provided in this disclosure is equipped with the above-mentioned optical imaging lens assembly to obtain high-definition captured images.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking five lenses as an example, the optical imaging lens assembly is not limited to include five lenses. The optical imaging lens assembly may also include other numbers of lenses if desired.

Some specific examples of an optical imaging lens assembly applicable to the above embodiment will be further described below with reference to the accompanying drawings.

EXAMPLE 1

An optical imaging lens assembly according to example 1 of the present disclosure is described below with reference to FIG. 1 to FIG. 2D. FIG. 1 shows a schematic structural view of the optical imaging lens assembly according to example 1 of the present disclosure.

As shown in FIG. 1, the optical imaging lens assembly includes a first lens E1, a second lens E2, a third lens E3, a stop STO, a fourth lens E4, a fifth lens E5, an optical filter E6 and an imaging plane S13, which are sequentially arranged from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a concave surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a convex surface, and an image-side surface S10 of the fifth lens E5 is a concave surface. The optical filter E6 has an object-side surface S11 and an image-side surface S12. Light from an object sequentially passes through the respective surfaces S1 to S12 and is finally imaged on the imaging plane S13.

Table 1 shows a table of basic parameters of the optical imaging lens assembly in example 1, wherein the units for the radius of curvature, the thickness and the focal length are millimetre (mm).

TABLE 1

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 6.003 | 4.1180 | 1.54 | 55.7 | −0.0366 |
| S2 | aspheric | 5.0000E+16 | 1.1172 | | | 0.0000 |
| S3 | aspheric | −8.3079 | 0.7962 | 1.62 | 25.9 | 0.0000 |
| S4 | aspheric | 5.6371 | 0.5350 | | | −8.8191 |
| S5 | aspheric | 3.1227 | 0.9175 | 1.54 | 55.7 | −3.5907 |
| S6 | aspheric | 5.3440 | 0.3895 | | | −0.2277 |
| STO | spherical | infinite | 0.1180 | | | |
| S7 | aspheric | −14.8524 | 1.0470 | 1.57 | 37.3 | −18.2875 |
| S8 | aspheric | −51.9021 | 0.0300 | | | 0.0000 |
| S9 | aspheric | 5.0335 | 0.6951 | 1.67 | 19.2 | −7.9813 |
| S10 | aspheric | 8.8149 | 2.0000 | | | 0.0000 |
| S11 | spherical | infinite | 0.1100 | 1.52 | 64.2 | |
| S12 | spherical | infinite | 11.1265 | | | |
| S13 | spherical | infinite | | | | |

In example 1, the object-side surface and the image-side surface of any one of the first lens E1 to the fifth lens E5 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \qquad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; $A_i$ is a correction coefficient for the i-th order of the aspheric surface. Table 2 below shows high-order coefficients A4, A6, A8, A10, A12, A14 and A16 applicable to each aspheric surface S1-S10 in example 1

TABLE 2

| Surface number | A4 | A6 | A8 | A10 | A12 | A14 | A16 |
|---|---|---|---|---|---|---|---|
| S1 | −5.5996E−05 | −1.5503E−06 | 6.7944E−08 | −6.7911E−09 | 0.0000E+00 | 0.0000E+00 | 0.0000E+00 |
| S2 | 2.7463E−05 | 2.7561E−06 | 1.1163E−07 | −6.0972E−09 | 0.0000E+00 | 0.0000E+00 | 0.0000E+00 |
| S3 | 5.4583E−03 | −5.3973E−04 | 1.1960E−05 | 9.6909E−06 | −1.6734E−06 | 1.1847E−07 | −3.2652E−09 |
| S4 | 1.1553E−03 | 1.1681E−03 | −4.1321E−04 | 6.9701E−05 | −5.4853E−06 | 1.5135E−07 | 0.0000E+00 |

TABLE 2-continued

| Surface number | A4 | A6 | A8 | A10 | A12 | A14 | A16 |
|---|---|---|---|---|---|---|---|
| S5 | −3.7152E−03 | 1.3238E−04 | 1.8997E−04 | −6.0059E−05 | 8.4677E−06 | −4.1379E−07 | 0.0000E+00 |
| S6 | −1.0988E−02 | −1.1878E−03 | 9.8797E−04 | −1.7098E−04 | 1.0347E−05 | 0.0000E+00 | 0.0000E+00 |
| S7 | 8.2131E−03 | −2.8194E−03 | 9.6781E−04 | −1.6586E−04 | 9.7059E−06 | 0.0000E+00 | 0.0000E+00 |
| S8 | 1.1391E−02 | −7.6368E−04 | 1.3154E−04 | −8.8211E−05 | 1.4426E−05 | −7.4179E−07 | 0.0000E+00 |
| S9 | −8.9971E−04 | 4.2302E−04 | −8.6413E−05 | −1.7365E−05 | 5.6873E−06 | −3.4730E−07 | 0.0000E+00 |
| S10 | −8.9697E−03 | 1.2876E−03 | −1.5977E−04 | 5.5763E−06 | 1.5732E−06 | −1.1312E−07 | 0.0000E+00 |

Figure 2A:
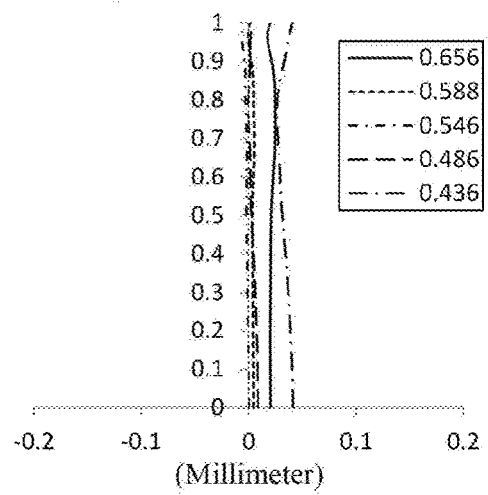
FIGS. 2A to 2D illustrate a longitudinal aberration curve, an astigmatic curve, a distortion curve and a lateral color curve of the optical imaging lens assembly of the Example 1, respectively.
Figure 2B:
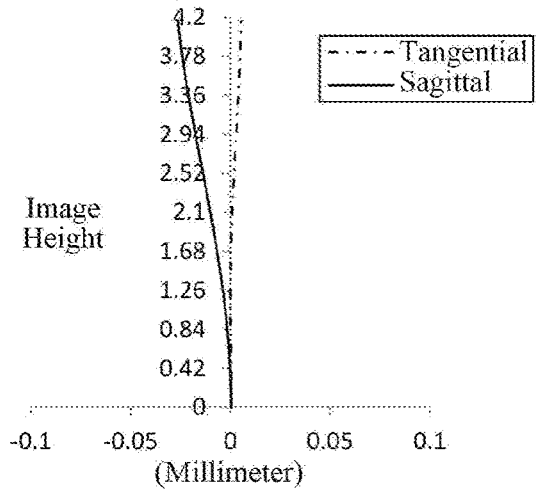
Figure 2C:
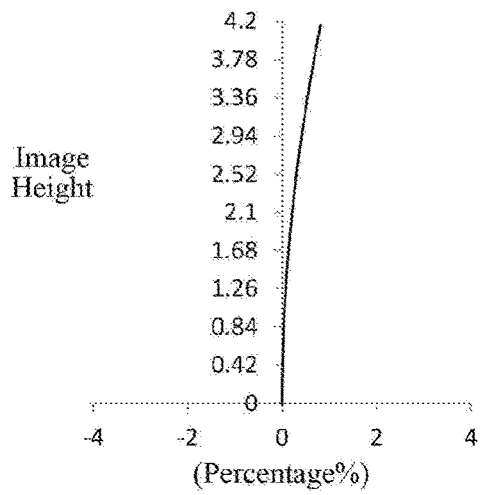
Figure 2D:
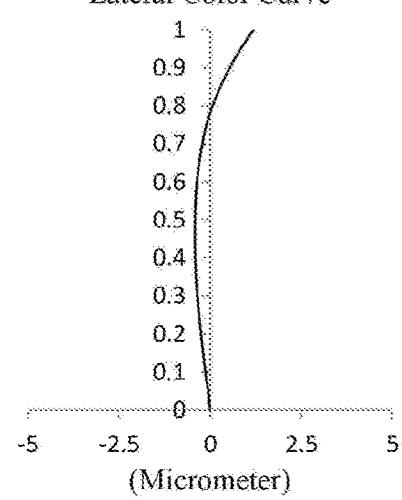

FIG. 2A illustrates a longitudinal aberration curve of the optical imaging lens assembly according to example 1, representing deviations of focal points converged by light of different wavelengths after passing through the optical imaging lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion at different image heights. FIG. 2D illustrates a lateral color curve of the optical imaging lens assembly according to example 1, representing deviations of different image heights on an imaging plane after light passes through the optical imaging lens assembly. It can be seen from FIG. 2A to FIG. 2D that the optical imaging lens assembly provided in example 1 may achieve a good image quality.

EXAMPLE 2

Figure 3:
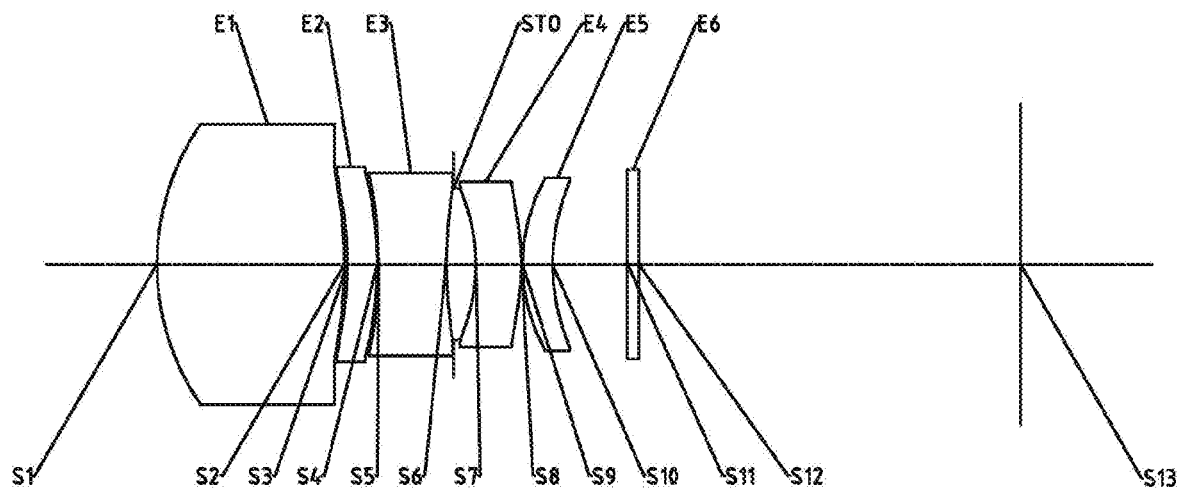
FIG. 3 illustrates a schematic structural view of an optical imaging lens assembly according to Example 2 of the present disclosure.

An optical imaging lens assembly according to example 2 of the present disclosure is described below with reference to FIG. 3 to FIG. 4D. FIG. 3 shows a schematic structural view of the optical imaging lens assembly according to example 2 of the present disclosure.

As shown in FIG. 3, the optical imaging lens assembly includes a first lens E1, a second lens E2, a third lens E3, a stop STO, a fourth lens E4, a fifth lens E5, an optical filter E6 and an imaging plane S13, which are sequentially arranged from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a concave surface, and an image-side surface S4 of the second lens E2 is a convex surface. The third lens E3 has a negative refractive power. An object-side surface S5 of the third lens E3 is a concave surface, and an image-side surface S6 of the third lens E3 is a concave surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a convex surface, and an image-side surface S10 of the fifth lens E5 is a concave surface. The optical filter E6 has an object-side surface S11 and an image-side surface S12. Light from an object sequentially passes through the respective surfaces S1 to S12 and is finally imaged on the imaging plane S13.

Table 3 shows a table of basic parameters of the optical imaging lens assembly in example 2, wherein the units for the radius of curvature, the thickness and the focal length are millimeter (mm).

TABLE 3

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 6.626 | 5.0000 | 1.54 | 55.7 | −0.0433 |
| S2 | aspheric | −10.7489 | 0.0768 | | | −16.0963 |
| S3 | aspheric | −9.3048 | 0.8000 | 1.62 | 25.9 | −9.5927 |
| S4 | aspheric | −9.7296 | 0.0300 | | | 0.0000 |
| S5 | aspheric | −12.6728 | 1.8014 | 1.61 | 25.6 | −2.2931 |
| S6 | aspheric | 9.8103 | 0.1987 | | | −6.2140 |
| STO | spherical | infinite | 0.6014 | | | |
| S7 | aspheric | −4.4720 | 1.2074 | 1.59 | 29.9 | 0.0954 |
| S8 | aspheric | −6.2273 | 0.0300 | | | −3.4462 |
| S9 | aspheric | 4.5141 | 0.8000 | 1.67 | 19.2 | −2.5077 |
| S10 | aspheric | 5.3180 | 2.0000 | | | 0.0000 |
| S11 | spherical | infinite | 0.3000 | 1.52 | 64.2 | |
| S12 | spherical | infinite | 10.1766 | | | |
| S13 | spherical | infinite | | | | |

In example 2, the object-side surface and the image-side surface of any one of the first lens E1 to the fifth lens E5 are aspheric. Table 4 below shows high-order coefficients A4, A6, A8, and A10 applicable to each aspheric surface S1-S10 in example 2.

TABLE 4

| Surface number | A4 | A6 | A8 | A10 |
|---|---|---|---|---|
| S1 | 1.0126E−05 | 0.0000E+00 | 0.0000E+00 | 0.0000E+00 |
| S2 | −1.2132E−04 | 1.2317E−04 | −1.2117E−05 | 0.0000E+00 |

TABLE 4-continued

| Surface number | A4 | A6 | A8 | A10 |
|---|---|---|---|---|
| S3 | 1.7234E−04 | 1.2729E−04 | −1.7784E−05 | 0.0000E+00 |
| S4 | 7.6876E−04 | −1.2326E−04 | 1.1652E−06 | 0.0000E+00 |
| S5 | −4.4583E−04 | −1.3129E−04 | 1.4541E−05 | 0.0000E+00 |
| S6 | −1.6339E−03 | −6.3545E−06 | −1.8700E−05 | 0.0000E+00 |
| S7 | 5.8445E−03 | −3.8280E−04 | −9.1233E−06 | −5.2697E−07 |
| S8 | 5.2143E−03 | −2.6724E−04 | 0.0000E+00 | 0.0000E+00 |
| S9 | 8.3679E−04 | 4.4457E−04 | −4.2622E−05 | 2.8362E−07 |
| S10 | −4.1350E−03 | 1.0248E−03 | −9.5414E−05 | 2.2663E−06 |

Figure 4A:
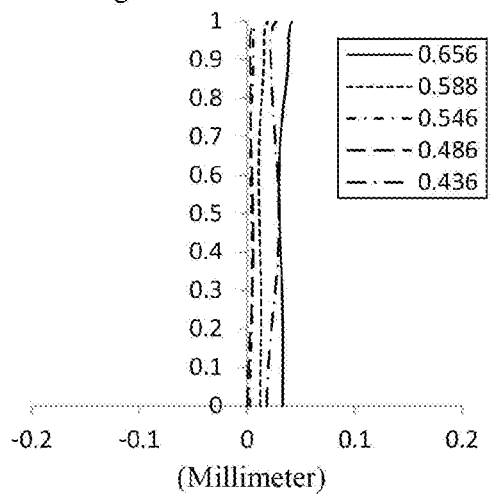
FIGS. 4A to 4D illustrate a longitudinal aberration curve, an astigmatic curve, a distortion curve and a lateral color curve of the optical imaging lens assembly of the Example 2, respectively.
Figure 4B:
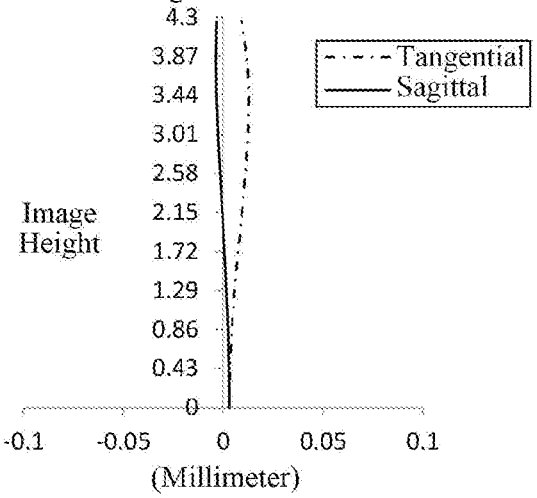
Figure 4C:
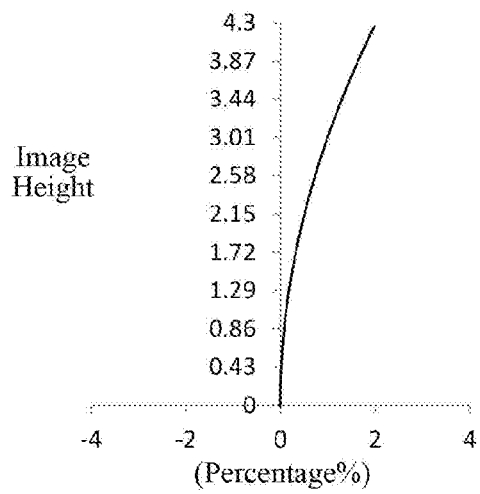
Figure 4D:
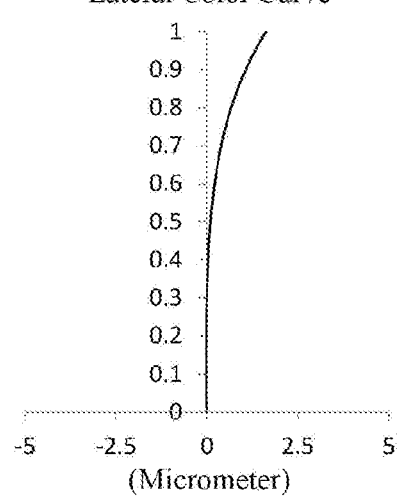

FIG. 4A illustrates a longitudinal aberration curve of the optical imaging lens assembly according to example 2, representing deviations of focal points converged by light of different wavelengths after passing through the optical imaging lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion at different image heights. FIG. 4D illustrates a lateral color curve of the optical imaging lens assembly according to example 2, representing deviations of different image heights on an imaging plane after light passes through the optical imaging lens assembly. It can be seen from FIG. 4A to FIG. 4D that the optical imaging lens assembly provided in example 2 may achieve a good image quality.

EXAMPLE 3

Figure 5:
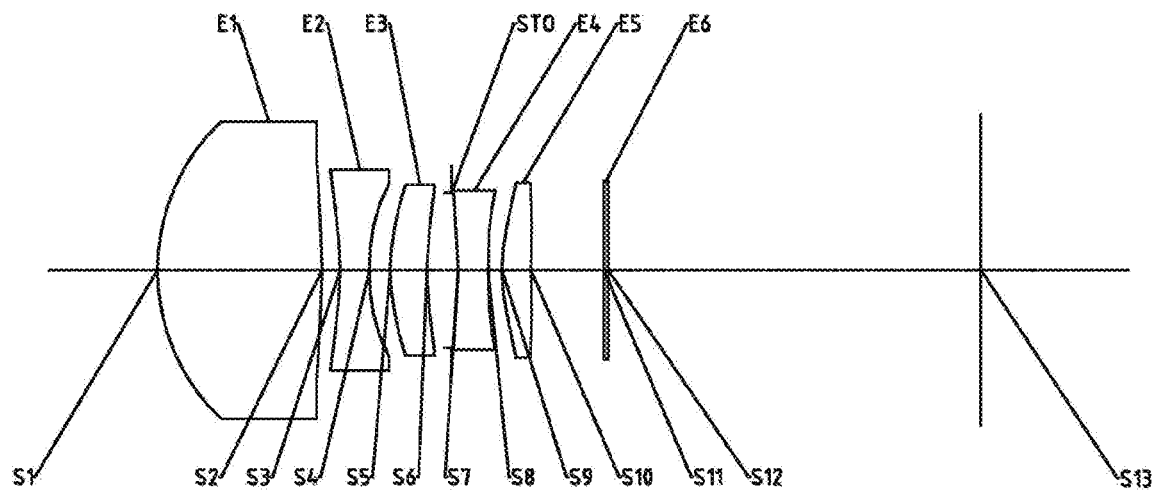
FIG. 5 illustrates a schematic structural view of an optical imaging lens assembly according to Example 3 of the present disclosure.

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly includes a first lens E1, a second lens E2, a third lens E3, a stop STO, a fourth lens E4, a fifth lens E5, an optical filter E6 and an imaging plane S13, which are sequentially arranged from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a concave surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a concave surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a concave surface. The optical filter E6 has an object-side surface S11 and an image-side surface S12. Light from an object sequentially passes through the respective surfaces S1 to S12 and is finally imaged on the imaging plane S13.

Table 5 shows a table of basic parameters of the optical imaging lens assembly in example 3, wherein the units for the radius of curvature, the thickness and the focal length are millimeter (mm).

TABLE 5

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 | aspheric | 5.687 | 4.5000 | 1.54 | 55.6 | 0.1474 |
| S2 | aspheric | −20.4444 | 0.4931 | | | −9.4126 |
| S3 | aspheric | −8.3216 | 0.8000 | 1.59 | 30.9 | 0.0000 |
| S4 | aspheric | 7.7188 | 0.5661 | | | 6.1118 |
| S5 | aspheric | 5.0273 | 1.0000 | 1.54 | 55.6 | −3.4375 |
| S6 | aspheric | 7.0188 | 0.6800 | | | 0.8365 |
| STO | spherical | infinite | 0.1747 | | | |
| S7 | aspheric | −7.0416 | 0.8209 | 1.67 | 19.4 | −34.4482 |
| S8 | aspheric | 71.3552 | 0.3804 | | | 0.0000 |
| S9 | aspheric | 5.0593 | 0.7884 | 1.67 | 19.2 | −10.0984 |
| S10 | aspheric | 24.9555 | 2.0000 | | | 0.0000 |
| S11 | spherical | infinite | 0.1100 | 1.52 | 64.2 | |
| S12 | spherical | infinite | 10.1913 | | | |
| S13 | spherical | infinite | | | | |

In example 3, the object-side surface and the image-side surface of any one of the first lens E1 to the fifth lens E5 are aspheric. Table 6 below shows high-order coefficients A4, A6, A8, A10, A12, A14 and A16 applicable to each aspheric surface S1-S10 in example 3.

TABLE 6

| Surface number | A4 | A6 | A8 | A10 | A12 | A14 | A16 |
|---|---|---|---|---|---|---|---|
| S1 | −1.8144E−04 | −2.4561E−07 | −5.8604E−08 | 1.5769E−08 | 0.0000E+00 | 0.0000E+00 | 0.0000E+00 |
| S2 | −3.1015E−03 | 1.2595E−03 | −1.8384E−04 | 1.6846E−05 | −9.3676E−07 | 2.2369E−08 | 0.0000E+00 |
| S3 | 2.1549E−03 | 1.7562E−03 | −4.7410E−04 | 6.1716E−05 | −4.9249E−06 | 2.1608E−07 | −3.6884E−09 |
| S4 | 3.5782E−03 | 1.6118E−04 | 2.2201E−04 | −9.3071E−05 | 8.3274E−06 | −1.9644E−07 | 0.0000E+00 |
| S5 | −6.6546E−03 | −2.0438E−04 | 7.1129E−04 | −1.5275E−04 | 1.0543E−05 | −6.8544E−08 | 0.0000E+00 |
| S6 | −1.1261E−02 | 5.9895E−04 | 3.6066E−04 | −9.1768E−05 | 6.7842E−06 | 0.0000E+00 | 0.0000E+00 |
| S7 | 1.2529E−02 | −3.0815E−03 | 5.2979E−04 | −6.9400E−05 | 3.3922E−06 | 0.0000E+00 | 0.0000E+00 |
| S8 | 2.1914E−02 | −7.4020E−03 | 1.9656E−03 | −3.5905E−04 | 3.5396E−05 | −1.3850E−06 | 0.0000E+00 |
| S9 | 4.3473E−03 | −3.5935E−03 | 1.0668E−03 | −1.6964E−04 | 1.2297E−05 | −1.4584E−07 | 0.0000E+00 |
| S10 | −4.5039E−03 | −8.7719E−05 | −9.1255E−06 | 3.2060E−05 | −8.2128E−06 | 6.9853E−07 | 0.0000E+00 |

Figure 6A:
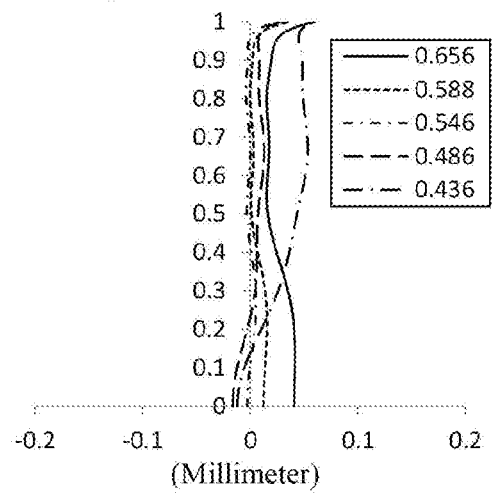
FIGS. 6A to 6D illustrate a longitudinal aberration curve, an astigmatic curve, a distortion curve and a lateral color curve of the optical imaging lens assembly of the Example 3, respectively.
Figure 6B:
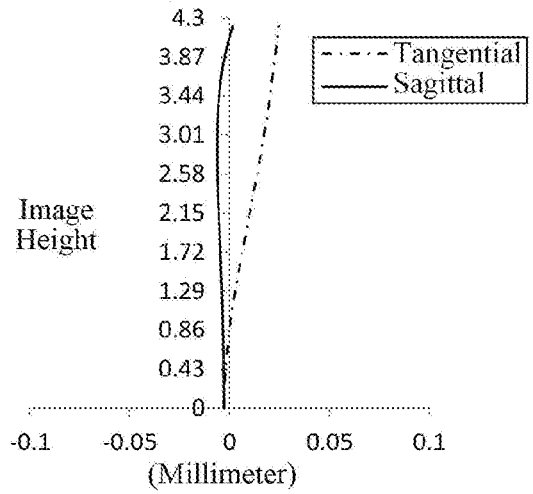
Figure 6C:
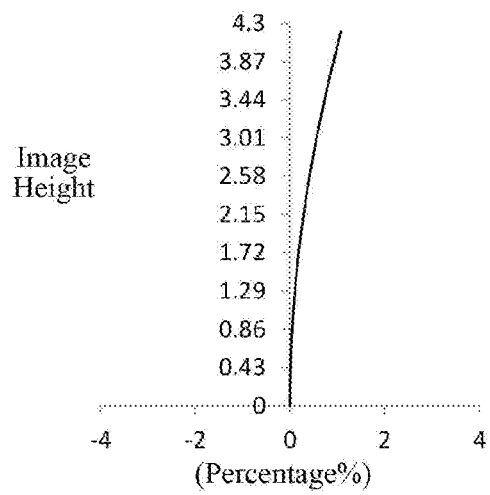
Figure 6D:
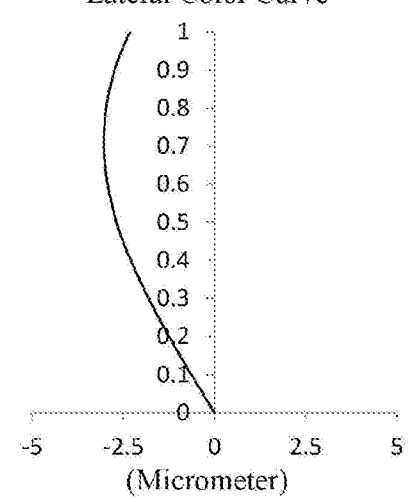

FIG. 6A illustrates a longitudinal aberration curve of the optical imaging lens assembly according to example 3, representing deviations of focal points converged by light of different wavelengths after passing through the optical imaging lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion at different image heights. FIG. 6D illustrates a lateral color curve of the optical imaging lens assembly according to example 3, representing deviations of different image heights on an imaging plane after light passes through the optical imaging lens assembly. It can be seen from FIG. 6A to FIG. 6D that the optical imaging lens assembly provided in example 3 may achieve a good image quality.

EXAMPLE 4

Figure 7:
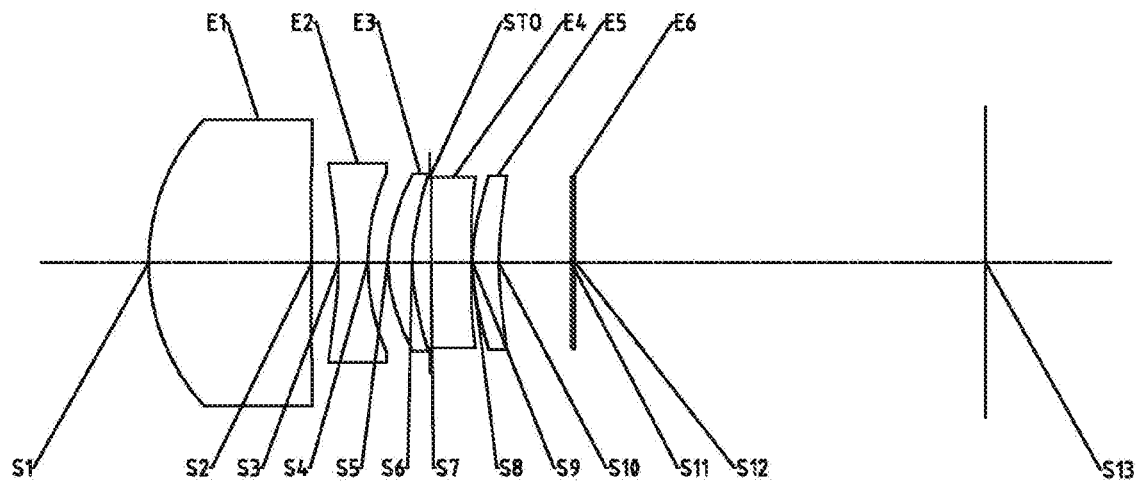
FIG. 7 illustrates a schematic structural view of an optical imaging lens assembly according to Example 4 of the present disclosure.

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly includes a first lens E1, a second lens E2, a third lens E3, a stop STO, a fourth lens E4, a fifth lens E5, an optical filter E6 and an imaging plane S13, which are sequentially arranged from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a concave surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a convex surface, and an image-side surface S10 of the fifth lens E5 is a concave surface. The optical filter E6 has an object-side surface S11 and an image-side surface S12. Light from an object sequentially passes through the respective surfaces S1 to S12 and is finally imaged on the imaging plane S13.

Table 7 shows a table of basic parameters of the optical imaging lens assembly in example 4, wherein the units for the radius of curvature, the thickness and the focal length are millimeter (mm).

TABLE 7

| | | | | Material | | |
|---|---|---|---|---|---|---|
| Surface number | Surface type | Radius of curvature | Thickness | Refractive index | Abbe number | Conic coefficient |
| OBJ | spherical | infinite | infinite | | | |
| S1 | aspheric | 5.929 | 4.5000 | 1.54 | 55.6 | 0.1243 |
| S2 | aspheric | −67.8242 | 0.7401 | | | −3.0110 |
| S3 | aspheric | −8.1584 | 0.8000 | 1.62 | 26.4 | 0.0000 |
| S4 | aspheric | 5.8934 | 0.5449 | | | −8.3699 |
| S5 | aspheric | 3.2376 | 0.6779 | 1.54 | 55.6 | −3.4739 |
| S6 | aspheric | 4.5331 | 0.4880 | | | −0.4077 |
| STO | spherical | infinite | 0.0473 | | | |
| S7 | aspheric | −25.4682 | 1.1000 | 1.58 | 38.4 | −18.5383 |
| S8 | aspheric | −38.6702 | 0.0300 | | | 0.0000 |
| S9 | aspheric | 4.9881 | 0.7236 | 1.67 | 19.2 | −7.0733 |
| S10 | aspheric | 7.7983 | 2.0000 | | | 0.0000 |

TABLE 7-continued

| Surface number | Surface type | Radius of curvature | Thickness | Material Refractive index | Abbe number | Conic coefficient |
|---|---|---|---|---|---|---|
| S11 | spherical | infinite | 0.1100 | 1.52 | 64.2 | |
| S12 | spherical | infinite | 11.3142 | | | |
| S13 | spherical | infinite | | | | |

In example 4, the object-side surface and the image-side surface of any one of the first lens E1 to the fifth lens E5 are aspheric. Table 8 below shows high-order coefficients A4, A6, A8, A10, A12, A14 and A16 applicable to each aspheric surface S1-S10 in example 4.

TABLE 8

| Surface number | A4 | A6 | A8 | A10 | A12 | A14 | A16 |
|---|---|---|---|---|---|---|---|
| S1 | −8.9275E−05 | −4.7409E−07 | 7.5790E−08 | 9.9488E−10 | 0.0000E+00 | 0.0000E+00 | 0.0000E+00 |
| S2 | 3.3688E−04 | 1.2971E−04 | 2.7108E−06 | −1.4755E−06 | 9.7690E−08 | −3.2014E−09 | 0.0000E+00 |
| S3 | 3.3328E−03 | 4.0861E−04 | −1.0328E−04 | 1.0921E−05 | −8.0416E−07 | 3.6685E−08 | −8.2325E−10 |
| S4 | −3.4892E−04 | 1.4971E−03 | −2.5556E−04 | 2.3635E−05 | −1.5726E−06 | 3.9674E−08 | 0.0000E+00 |
| S5 | −4.2849E−03 | −3.4011E−04 | 3.4274E−04 | −4.7328E−05 | 3.1185E−06 | −8.0388E−08 | 0.0000E+00 |
| S6 | −1.0654E−02 | −1.1158E−03 | 7.4152E−04 | −1.0370E−04 | 5.1371E−06 | 0.0000E+00 | 0.0000E+00 |
| S7 | 7.5747E−03 | −1.5448E−03 | 4.1460E−04 | −6.7526E−05 | 3.4437E−06 | 0.0000E+00 | 0.0000E+00 |
| S8 | 1.0362E−02 | −4.8082E−04 | 1.0012E−04 | −3.9088E−05 | 7.1349E−06 | −3.7657E−07 | 0.0000E+00 |
| S9 | 1.3130E−04 | 1.1238E−04 | −4.4749E−05 | −9.5494E−06 | 3.1781E−06 | −1.8895E−07 | 0.0000E+00 |
| S10 | −8.1499E−03 | 1.0691E−03 | −1.3076E−04 | 5.6256E−06 | 8.2865E−07 | −5.8380E−08 | 0.0000E+00 |

Figure 8A:
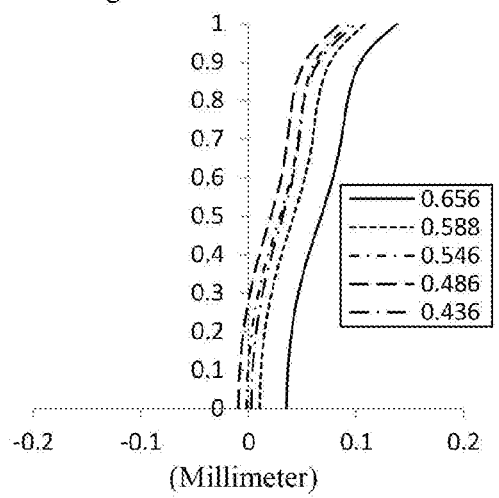
FIGS. 8A to 8D illustrate a longitudinal aberration curve, an astigmatic curve, a distortion curve and a lateral color curve of the optical imaging lens assembly of the Example 4, respectively.
Figure 8B:
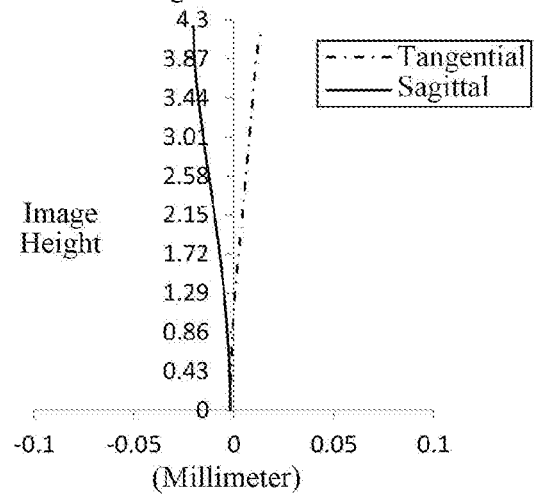
Figure 8C:
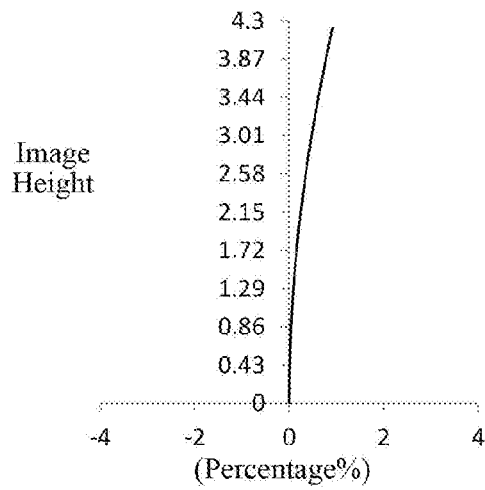
Figure 8D:
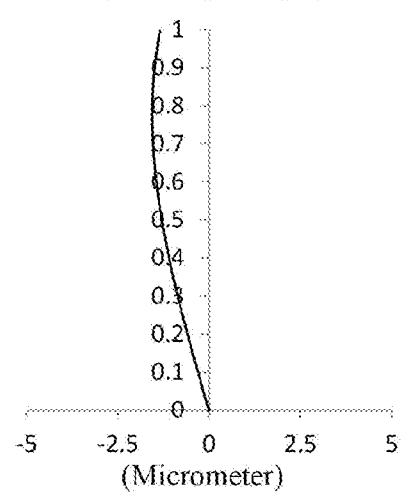

FIG. 8A illustrates a longitudinal aberration curve of the optical imaging lens assembly according to example 4, representing deviations of focal points converged by light of different wavelengths after passing through the optical imaging lens assembly. FIG. 8B illustrates an astigmatic curve of the optical imaging lens assembly according to example 4, representing a curvature of a tangential plane and a curvature of a sagittal plane. FIG. 8C illustrates a distortion curve of the optical imaging lens assembly according to example 4, representing amounts of distortion at different image heights. FIG. 8D illustrates a lateral color curve of the optical imaging lens assembly according to example 4, representing deviations of different image heights on an imaging plane after light passes through the optical imaging lens assembly. It can be seen from FIG. 8A to FIG. 8D that the optical imaging lens assembly provided in example 4 may achieve a good image quality.

EXAMPLE 5

Figure 9:
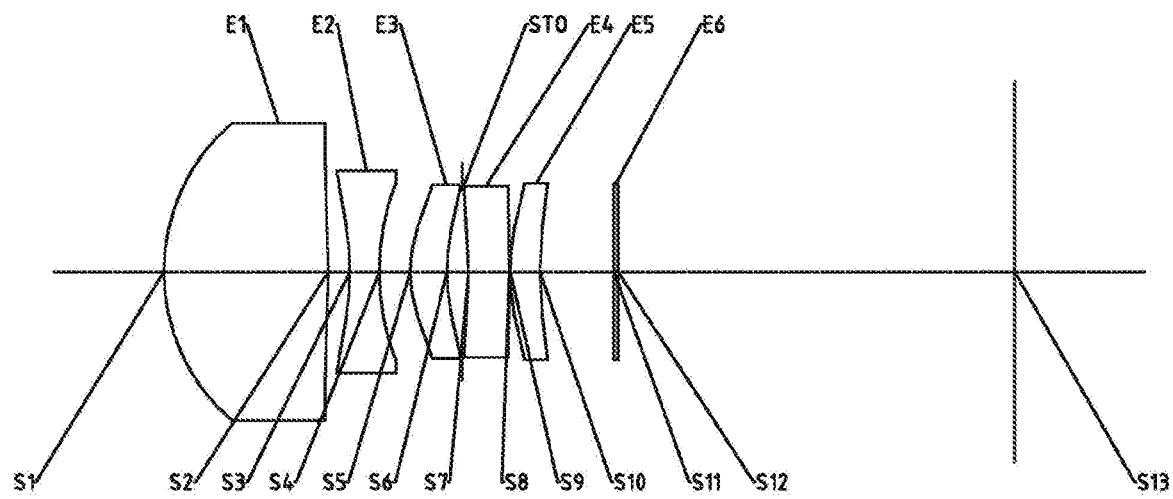
FIG. 9 illustrates a schematic structural view of an optical imaging lens assembly according to Example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly includes a first lens E1, a second lens E2, a third lens E3, a stop STO, a fourth lens E4, a fifth lens E5, an optical filter E6 and an imaging plane S13, which are sequentially arranged from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a concave surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a convex surface, and an image-side surface S10 of the fifth lens E5 is a concave surface. The optical filter E6 has an object-side surface S11 and an image-side surface S12. Light from an object sequentially passes through the respective surfaces S1 to S12 and is finally imaged on the imaging plane S13.

Table 9 shows a table of basic parameters of the optical imaging lens assembly in example 5, wherein the units for the radius of curvature, the thickness and the focal length are millimeter (mm).

TABLE 9

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 5.412 | 4.4456 | 1.54 | 55.6 | 0.0963 |
| S2 | aspheric | −27.9993 | 0.5827 | | | −3.0097 |
| S3 | aspheric | −7.1437 | 0.8000 | 1.72 | 29.2 | 0.0000 |
| S4 | aspheric | 6.6037 | 0.8299 | | | −11.2455 |
| S5 | aspheric | 3.2370 | 0.9986 | 1.54 | 55.6 | −3.8133 |
| S6 | aspheric | 5.4041 | 0.4081 | | | 1.4689 |
| STO | spherical | infinite | 0.1726 | | | |
| S7 | aspheric | −8.7538 | 1.1000 | 1.60 | 26.1 | −11.3222 |
| S8 | aspheric | −12.9614 | 0.0300 | | | 0.0000 |
| S9 | aspheric | 5.6982 | 0.8000 | 1.67 | 19.2 | −8.6945 |
| S10 | aspheric | 8.8508 | 2.0000 | | | 0.0000 |
| S11 | spherical | infinite | 0.1100 | 1.52 | 64.2 | |
| S12 | spherical | infinite | 10.7224 | | | |
| S13 | spherical | infinite | | | | |

In example 5, the object-side surface and the image-side surface of any one of the first lens E1 to the fifth lens E5 are aspheric. Table 10 below shows high-order coefficients A4, A6, A8, A10, A12, A14 and A16 applicable to each aspheric surface S1-S10 in example 5.

TABLE 10

| Surface number | A4 | A6 | A8 | A10 | A12 | A14 | A16 |
|---|---|---|---|---|---|---|---|
| S1 | −8.9384E−05 | −1.1721E−06 | −1.0794E−07 | 1.2578E−08 | 0.0000E+00 | 0.0000E+00 | 0.0000E+00 |
| S2 | 1.1853E−04 | 1.7112E−04 | −2.4735E−06 | −1.6057E−06 | 1.1410E−07 | −2.7088E−09 | 0.0000E+00 |
| S3 | 1.1451E−03 | 1.8357E−03 | −4.9221E−04 | 7.1009E−05 | −6.5425E−06 | 3.5906E−07 | −8.8431E−09 |
| S4 | −3.6819E−03 | 3.2180E−03 | −5.5110E−04 | 3.5811E−05 | −2.6405E−07 | −3.6318E−08 | 0.0000E+00 |
| S5 | −2.9109E−03 | −1.1875E−03 | 6.9613E−04 | −1.2945E−04 | 9.7897E−06 | −2.1441E−07 | 0.0000E+00 |
| S6 | −4.6149E−03 | −3.1332E−03 | 1.0898E−03 | −1.5278E−04 | 7.7807E−06 | 0.0000E+00 | 0.0000E+00 |
| S7 | 1.4510E−02 | −3.6608E−03 | 6.4086E−04 | −7.0166E−05 | 2.6872E−06 | 0.0000E+00 | 0.0000E+00 |
| S8 | 1.1794E−02 | −7.0208E−04 | −1.5722E−05 | −4.1945E−05 | 8.2635E−06 | −4.3843E−07 | 0.0000E+00 |
| S9 | −3.1948E−03 | 1.3221E−03 | −1.1759E−04 | −3.5725E−05 | 7.6987E−06 | −3.8482E−07 | 0.0000E+00 |
| S10 | −9.4661E−03 | 1.6487E−03 | −1.0199E−04 | −1.8953E−05 | 3.9395E−06 | −1.7478E−07 | 0.0000E+00 |

Figure 10A:
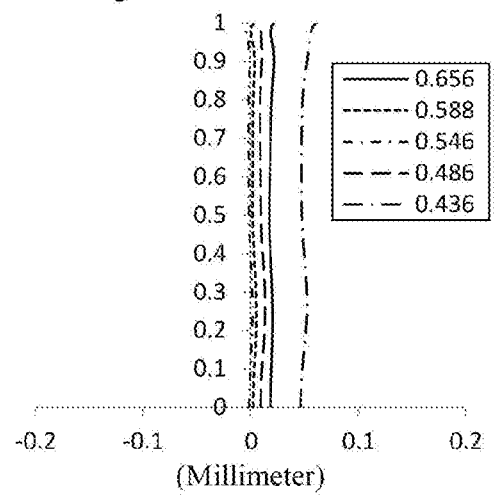
FIGS. 10A to 10D illustrate a longitudinal aberration curve, an astigmatic curve, a distortion curve and a lateral color curve of the optical imaging lens assembly of the Example 5, respectively.
Figure 10B:
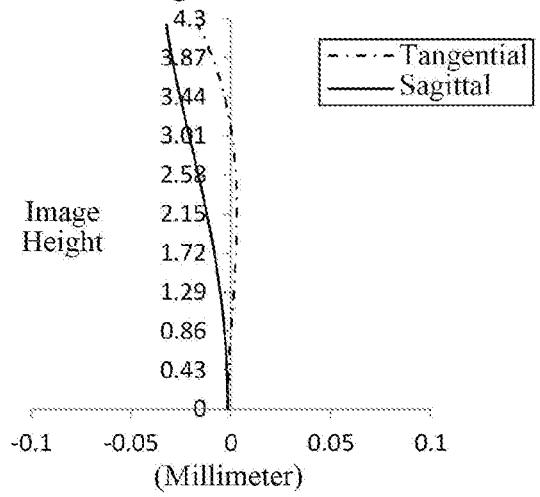
Figure 10C:
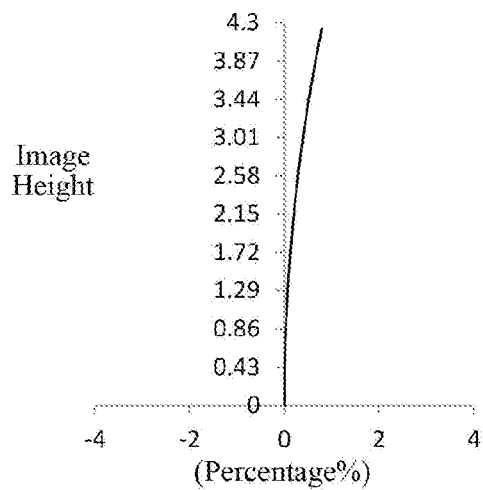
Figure 10D:
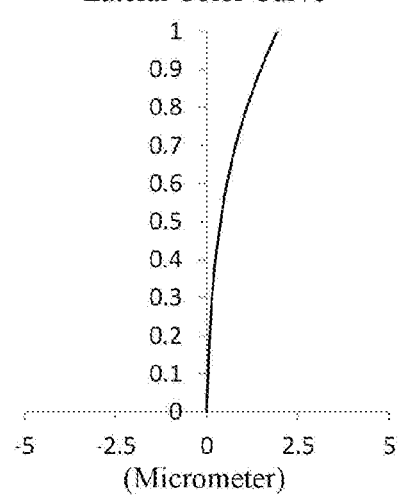

FIG. 10A illustrates a longitudinal aberration curve of the optical imaging lens assembly according to example 5, representing deviations of focal points converged by light of different wavelengths after passing through the optical imaging lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion at different image heights. FIG. 10D illustrates a lateral color curve of the optical imaging lens assembly according to example 5, representing deviations of different image heights on an imaging plane after light passes through the optical imaging lens assembly. It can be seen from FIG. 10A to FIG. 10D that the optical imaging lens assembly provided in example 5 may achieve a good image quality.

EXAMPLE 6

Figure 11:
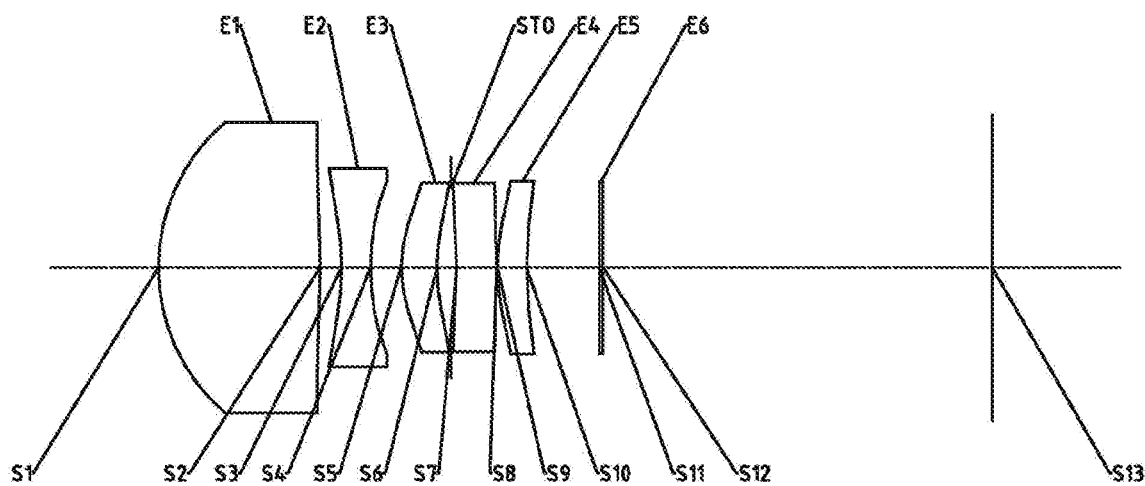
FIG. 11 illustrates a schematic structural view of an optical imaging lens assembly according to Example 6 of the present disclosure.

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly includes a first lens E1, a second lens E2, a third lens E3, a stop STO, a fourth lens E4, a fifth lens E5, an optical filter E6 and an imaging plane S13, which are sequentially arranged from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a concave surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a concave surface, and an image-side surface S8 of the fourth lens E4 is a convex surface. The fifth lens E5 has a positive refractive power. An object-side surface S9 of the fifth lens E5 is a convex surface, and an image-side surface S10 of the fifth lens E5 is a concave surface. The optical filter E6 has an object-side surface S11 and an image-side surface S12. Light from an object sequentially passes through the respective surfaces S1 to S12 and is finally imaged on the imaging plane S13.

Table 11 shows a table of basic parameters of the optical imaging lens assembly in example 6, wherein the units for the radius of curvature, the thickness and the focal length are millimeter (mm).

TABLE 11

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 5.390 | 4.4580 | 1.54 | 55.6 | 0.0865 |
| S2 | aspheric | −31.5476 | 0.5934 | | | −3.0107 |
| S3 | aspheric | −7.1644 | 0.8000 | 1.72 | 29.2 | 0.0000 |
| S4 | aspheric | 6.4230 | 0.8410 | | | −9.4104 |
| S5 | aspheric | 3.2328 | 0.9926 | 1.54 | 55.6 | −4.1460 |
| S6 | aspheric | 5.4355 | 0.3889 | | | −2.0121 |
| STO | spherical | infinite | 0.1499 | | | 0.0000 |
| S7 | aspheric | −9.9721 | 1.1000 | 1.63 | 22.5 | −6.8103 |
| S8 | aspheric | −14.8119 | 0.0300 | | | 0.0000 |
| S9 | aspheric | 5.6118 | 0.8000 | 1.67 | 19.2 | −8.3536 |
| S10 | aspheric | 8.8893 | 2.0000 | | | 0.0000 |
| S11 | spherical | infinite | 0.1100 | 1.52 | 64.2 | |
| S12 | spherical | infinite | 10.7370 | | | |
| S13 | spherical | infinite | | | | |

In example 6, the object-side surface and the image-side surface of any one of the first lens E1 to the fifth lens E5 are aspheric. Table 12 below shows high-order coefficients A4, A6, A8, A10, A12, A14 and A16 applicable to each aspheric surface S1-S10 in example 6.

TABLE 12

| Surface number | A4 | A6 | A8 | A10 | A12 | A14 | A16 |
|---|---|---|---|---|---|---|---|
| S1 | −9.3972E−05 | −2.1643E−06 | −1.0275E−07 | 9.6212E−09 | 0.0000E+00 | 0.0000E+00 | 0.0000E+00 |
| S2 | 6.3141E−04 | −1.2057E−04 | 4.4946E−05 | −4.5887E−06 | 1.5468E−07 | −9.0632E−10 | 0.0000E+00 |
| S3 | 2.8923E−03 | 5.9881E−04 | −1.3831E−04 | 1.7532E−05 | −1.7621E−06 | 1.0972E−07 | −2.8791E−09 |
| S4 | −3.1767E−03 | 2.5141E−03 | −4.3371E−04 | 4.8677E−05 | −4.3704E−06 | 1.9396E−07 | 0.0000E+00 |
| S5 | −3.5906E−03 | −1.1349E−03 | 5.6285E−04 | −8.8352E−05 | 6.3380E−06 | −1.9683E−07 | 0.0000E+00 |
| S6 | −4.5967E−03 | −2.2693E−03 | 1.0093E−03 | −1.5520E−04 | 8.6545E−06 | 0.0000E+00 | 0.0000E+00 |
| S7 | 1.5020E−02 | −3.5143E−03 | 7.0563E−04 | −1.0911E−04 | 6.4739E−06 | 0.0000E+00 | 0.0000E+00 |
| S8 | 1.3224E−02 | −1.5537E−03 | 6.7119E−05 | −5.4074E−05 | 1.0306E−05 | −5.6118E−07 | 0.0000E+00 |
| S9 | −1.9654E−03 | 8.6113E−04 | −1.7287E−04 | −6.9221E−06 | 4.0027E−06 | −2.2512E−07 | 0.0000E+00 |
| S10 | −9.5621E−03 | 2.0167E−03 | −2.9435E−04 | 2.4861E−05 | −9.0694E−07 | 2.4375E−08 | 0.0000E+00 |

Figure 12A:
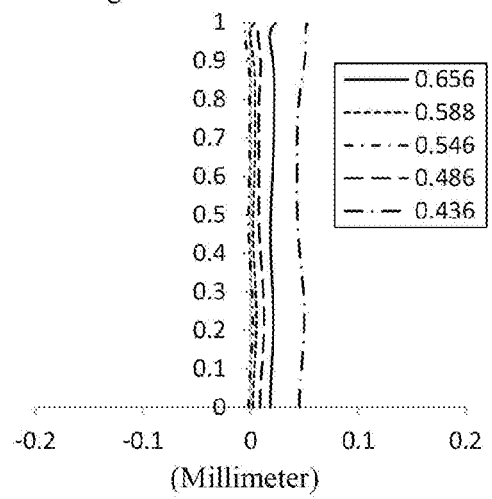
FIGS. 12A to 12D illustrate a longitudinal aberration curve, an astigmatic curve, a distortion curve and a lateral color curve of the optical imaging lens assembly of the Example 6, respectively.
Figure 12B:
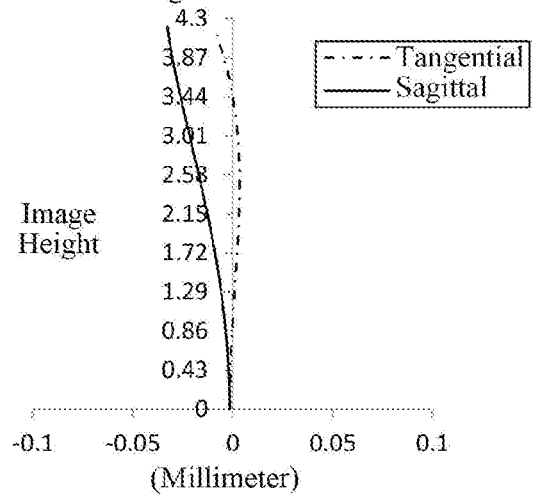
Figure 12C:
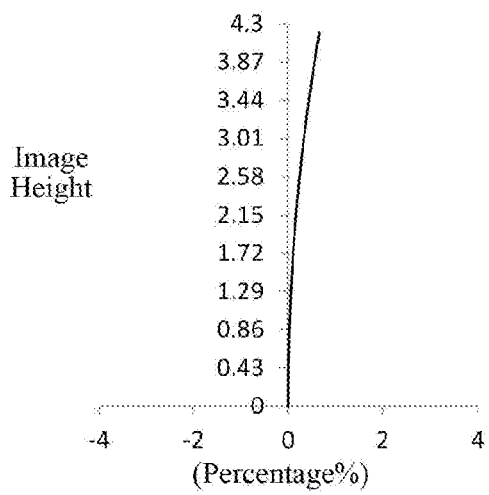
Figure 12D:
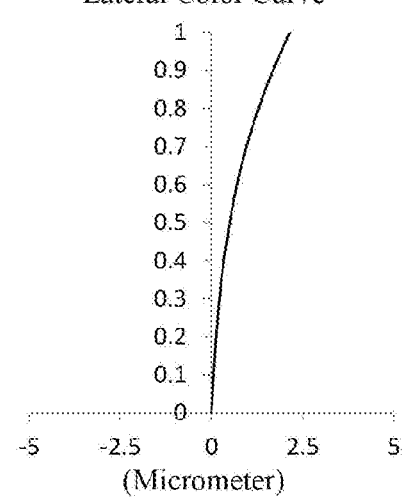

FIG. 12A illustrates a longitudinal aberration curve of the optical imaging lens assembly according to example 6, representing deviations of focal points converged by light of different wavelengths after passing through the optical imaging lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion at different image heights. FIG. 12D illustrates a lateral color curve of the optical imaging lens assembly according to example 6, representing deviations of different image heights on an imaging plane after light passes through the optical imaging lens assembly. It can be seen from FIG. 12A to FIG. 12D that the optical imaging lens assembly provided in example 6 may achieve a good image quality.

EXAMPLE 7

Figure 13:
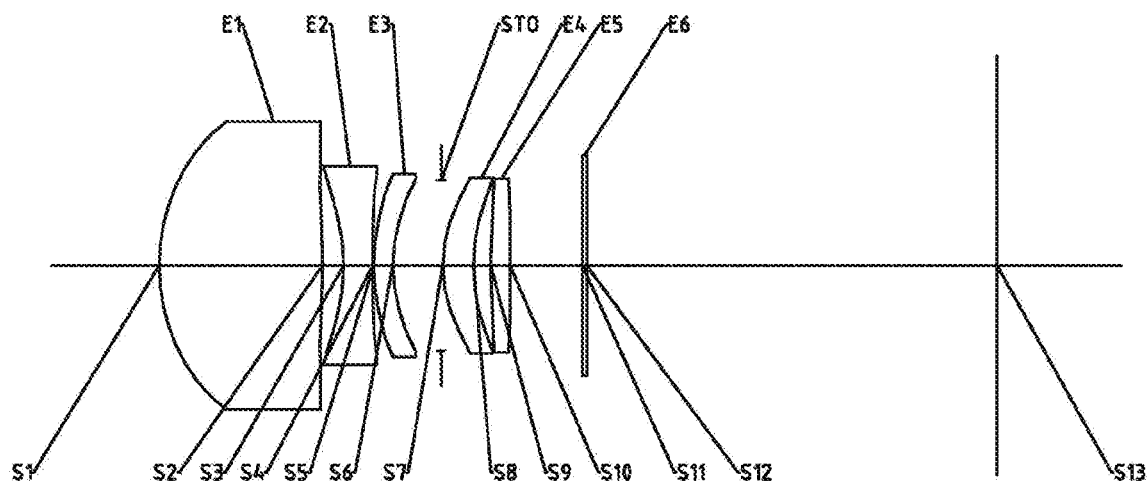
FIG. 13 illustrates a schematic structural view of an optical imaging lens assembly according to Example 7 of the present disclosure.

An optical imaging lens assembly according to example 7 of the present disclosure is described below with reference to FIG. 13 to FIG. 14D. FIG. 13 shows a schematic structural view of the optical imaging lens assembly according to example 7 of the present disclosure.

As shown in FIG. 13, the optical imaging lens assembly includes a first lens E1, a second lens E2, a third lens E3, a stop STO, a fourth lens E4, a fifth lens E5, an optical filter E6 and an imaging plane S13, which are sequentially arranged from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a concave surface, and an image-side surface S4 of the second lens E2 is a convex surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a concave surface. The optical filter E6 has an object-side surface S 11 and an image-side surface S12. Light from an object sequentially passes through the respective surfaces S1 to S12 and is finally imaged on the imaging plane S13.

Table 13 shows a table of basic parameters of the optical imaging lens assembly in example 7, wherein the units for the radius of curvature, the thickness and the focal length are millimeter (mm).

TABLE 13

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 5.541 | 4.5000 | 1.54 | 55.6 | 0.4259 |
| S2 | aspheric | −31.8547 | 0.5864 | | | −99.0000 |
| S3 | aspheric | −5.2554 | 0.8000 | 1.76 | 27.6 | 0.0000 |
| S4 | aspheric | −54.3325 | 0.0300 | | | −99.0000 |
| S5 | aspheric | 6.4290 | 0.5189 | 1.54 | 55.6 | −3.3412 |
| S6 | aspheric | 3.8291 | 1.3393 | | | −0.2637 |
| STO | spherical | infinite | 0.0409 | | | 0.0000 |
| S7 | aspheric | 4.0022 | 0.8481 | 1.50 | 57.5 | 0.1480 |
| S8 | aspheric | 6.5191 | 0.4714 | | | 0.0000 |
| S9 | aspheric | 12.9808 | 0.5345 | 1.67 | 19.2 | −96.0666 |
| S10 | aspheric | 31.1961 | 2.0000 | | | 0.0000 |
| S11 | spherical | infinite | 0.1100 | 1.52 | 64.2 | |
| S12 | spherical | infinite | 11.3100 | | | |
| S13 | spherical | infinite | | | | |

In example 7, the object-side surface and the image-side surface of any one of the first lens E1 to the fifth lens E5 are aspheric. Table 14 below shows high-order coefficients A4, A6, A8, A10, A12, A14 and A16 applicable to each aspheric surface S1-S10 in example 7.

TABLE 14

| Surface number | A4 | A6 | A8 | A10 | A12 | A14 | A16 |
|---|---|---|---|---|---|---|---|
| S1 | −2.2715E−04 | 1.5581E−06 | 1.1809E−07 | −2.2418E−09 | 0.0000E+00 | 0.0000E+00 | 0.0000E+00 |
| S2 | 0.0000E+00 | 0.0000E+00 | 0.0000E+00 | 0.0000E+00 | 0.0000E+00 | 0.0000E+00 | 0.0000E+00 |
| S3 | −1.1270E−03 | 3.3903E−03 | −9.9185E−04 | 1.6741E−04 | −1.7004E−05 | 9.5836E−07 | −2.4076E−08 |
| S4 | 0.0000E+00 | 0.0000E+00 | 0.0000E+00 | 0.0000E+00 | 0.0000E+00 | 0.0000E+00 | 0.0000E+00 |
| S5 | 2.6414E−02 | −2.3063E−02 | 7.9164E−03 | −1.2957E−03 | 1.0153E−04 | −2.9965E−06 | 0.0000E+00 |
| S6 | −1.5672E−03 | −9.0341E−03 | 3.5707E−03 | −5.2732E−04 | 2.7873E−05 | 0.0000E+00 | 0.0000E+00 |
| S7 | 1.2476E−02 | −6.4962E−03 | 1.2365E−03 | −1.2426E−04 | 4.9808E−06 | 0.0000E+00 | 0.0000E+00 |
| S8 | 1.8565E−02 | −6.8790E−03 | 1.1905E−03 | −7.0186E−05 | −7.3321E−06 | 8.7502E−07 | 0.0000E+00 |
| S9 | −1.2507E−03 | −2.4368E−03 | 1.2132E−03 | −2.3792E−04 | 2.0755E−05 | −6.2040E−07 | 0.0000E+00 |
| S10 | −8.0297E−03 | 4.8051E−05 | 6.0872E−04 | −1.6907E−04 | 1.9571E−05 | −8.4091E−07 | 0.0000E+00 |

Figure 14A:
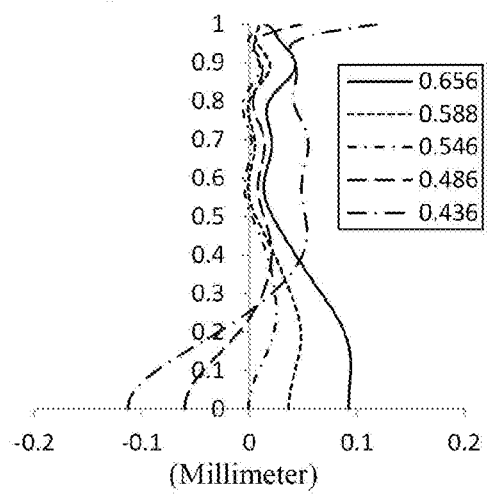
FIGS. 14A to 14D illustrate a longitudinal aberration curve, an astigmatic curve, a distortion curve and a lateral color curve of the optical imaging lens assembly of the Example 7, respectively.
Figure 14B:
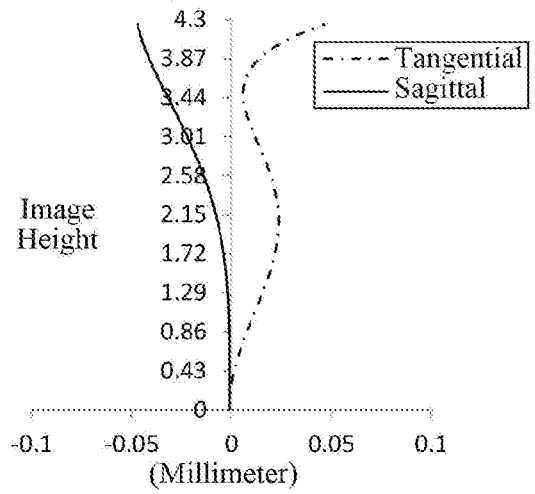
Figure 14C:
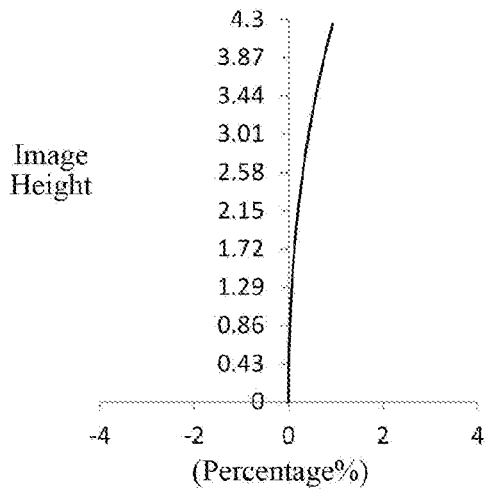
Figure 14D:
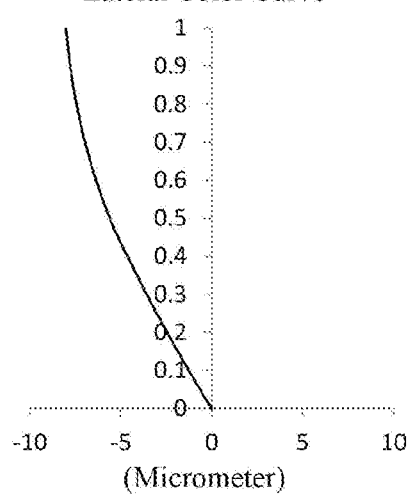

FIG. 14A illustrates a longitudinal aberration curve of the optical imaging lens assembly according to example 7, representing deviations of focal points converged by light of different wavelengths after passing through the optical imaging lens assembly. FIG. 14B illustrates an astigmatic curve of the optical imaging lens assembly according to example 7, representing a curvature of a tangential plane and a curvature of a sagittal plane. FIG. 14C illustrates a distortion curve of the optical imaging lens assembly according to example 7, representing amounts of distortion at different image heights. FIG. 14D illustrates a lateral color curve of the optical imaging lens assembly according to example 7, representing deviations of different image heights on an imaging plane after light passes through the optical imaging lens assembly. It can be seen from FIG. 14A to FIG. 14D that the optical imaging lens assembly provided in example 7 may achieve a good image quality.

EXAMPLE 8

Figure 15:
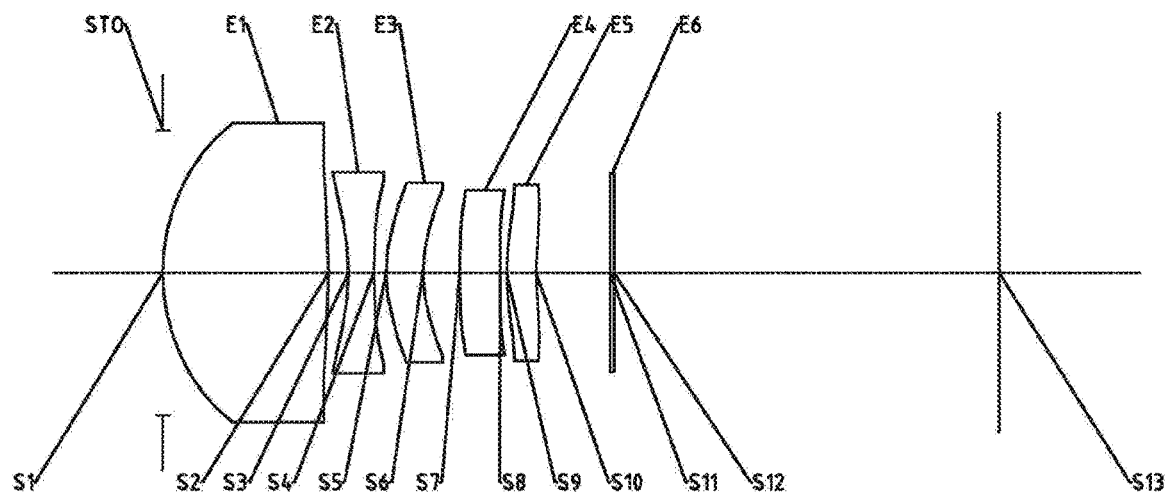
FIG. 15 illustrates a schematic structural view of an optical imaging lens assembly according to Example 8 of the present disclosure.

An optical imaging lens assembly according to example 8 of the present disclosure is described below with reference to FIG. 15 to FIG. 16D. FIG. 15 shows a schematic structural view of the optical imaging lens assembly according to example 8 of the present disclosure.

As shown in FIG. 15, the optical imaging lens assembly includes a stop STO, a first lens E1, a second lens E2, a third lens E3, a fourth lens E4, a fifth lens E5, an optical filter E6 and an imaging plane S13, which are sequentially arranged from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a concave surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a convex surface. The fifth lens E5 has a positive refractive power. An object-side surface S9 of the fifth lens E5 is a convex surface, and an image-side surface S10 of the fifth lens E5 is a concave surface. The optical filter E6 has an object-side surface S11 and an image-side surface S12. Light from an object sequentially passes through the respective surfaces S1 to S12 and is finally imaged on the imaging plane S13.

Table 15 shows a table of basic parameters of the optical imaging lens assembly in example 8, wherein the units for the radius of curvature, the thickness and the focal length are millimeter (mm).

TABLE 15

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | 0.0000 | | | |
| S1 | aspheric | 5.5447 | 4.5000 | 1.54 | 55.6 | 0.3614 |
| S2 | aspheric | −35.9176 | 0.5433 | | | 99.0000 |
| S3 | aspheric | −6.1182 | 0.6884 | 1.76 | 27.6 | 0.0000 |
| S4 | aspheric | 33.9946 | 0.3308 | | | 99.0000 |
| S5 | aspheric | 4.2260 | 1.0000 | 1.54 | 55.6 | −5.2090 |
| S6 | aspheric | 3.779 | 1.0045 | | | 0.1259 |
| S7 | aspheric | 78.7086 | 1.1000 | 1.58 | | −99.0000 |
| S8 | aspheric | −38.0925 | 0.1691 | | | 0.0000 |
| S9 | aspheric | 6.7077 | 0.8000 | 1.67 | 19.2 | −11.8309 |
| S10 | aspheric | 9.3474 | 2.0000 | | | 0.0000 |
| S11 | spherical | infinite | 0.1100 | 1.52 | 64.2 | |
| S12 | spherical | infinite | 10.4558 | | | |
| S13 | spherical | infinite | | | | |

In example 8, the object-side surface and the image-side surface of any one of the first lens E1 to the fifth lens E5 are aspheric. Table 16 below shows high-order coefficients A4, A6, A8, A10, A12, A14 and A16 applicable to each aspheric surface S1-S10 in example 8.

TABLE 16

| Surface number | A4 | A6 | A8 | A10 | A12 | A14 | A16 |
|---|---|---|---|---|---|---|---|
| S1 | −3.2157E−04 | 5.1738E−06 | −4.8116E−07 | 7.1730E−09 | 0.0000E+00 | 0.0000E+00 | 0.0000E+00 |
| S2 | −8.4492E−03 | 2.9866E−03 | −4.7960E−04 | 5.3117E−05 | −4.5645E−06 | 2.6876E−07 | −7.2289E−09 |
| S3 | 4.3335E−04 | 2.2263E−03 | −3.5272E−04 | 5.3207E−05 | 2.1877E−06 | −9.9138E−08 | −1.5059E−09 |
| S4 | 1.6435E−02 | −9.9139E−03 | 4.0440E−03 | −8.8803E−04 | 1.0164E−04 | −5.6650E−06 | 1.2032E−07 |
| S5 | 1.5469E−02 | −1.5046E−02 | 5.5883E−03 | −1.0101E−03 | 8.8388E−05 | −2.9347E−06 | 0.0000E+00 |
| S6 | −8.8986E−03 | −3.5027E−03 | 1.7087E−03 | −2.8879E−04 | 1.7155E−05 | 0.0000E+00 | 0.0000E+00 |
| S7 | 6.3570E−03 | 1.4816E−04 | 6.1884E−05 | −9.9406E−05 | 2.7547E−05 | −3.6219E−06 | 1.8078E−07 |
| S8 | 7.9440E−03 | 1.3035E−03 | −6.6343E−04 | 1.4712E−04 | −2.2565E−05 | 1.4834E−06 | 0.0000E+00 |
| S9 | −2.2532E−03 | 8.2320E−05 | −3.2635E−04 | 1.2901E−04 | −2.4641E−05 | 1.7911E−06 | 0.0000E+00 |
| S10 | −8.8020E−03 | 1.0595E−04 | 5.1506E−05 | −1.9199E−06 | −2.4571E−06 | 3.0910E−07 | 0.0000E+00 |

Figure 16A:
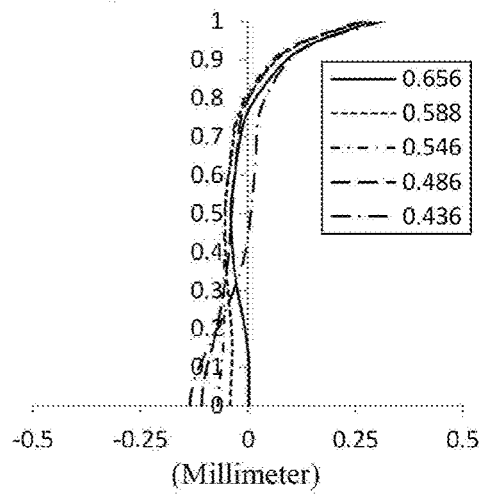
FIGS. 16A to 16D illustrate a longitudinal aberration curve, an astigmatic curve, a distortion curve and a lateral color curve of the optical imaging lens assembly of the Example 8, respectively.
Figure 16B:
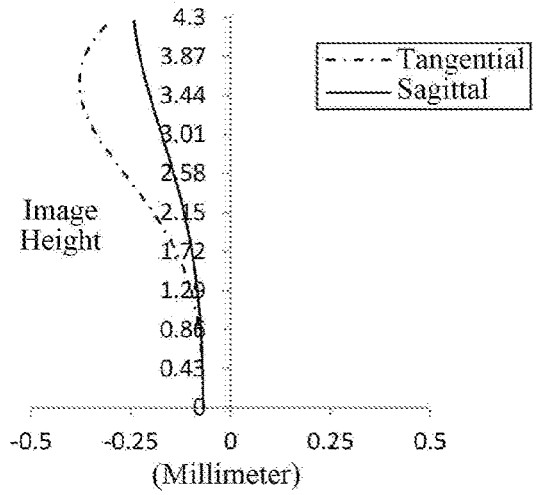
Figure 16C:
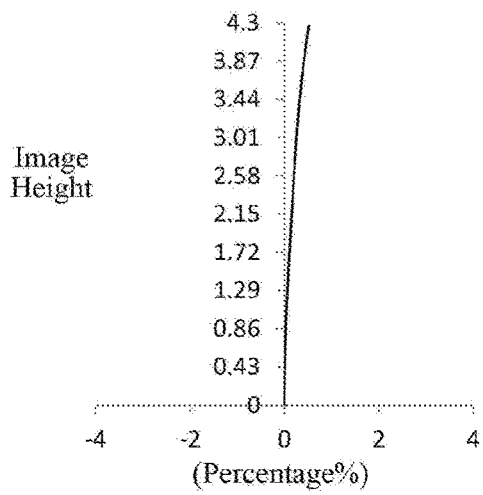
Figure 16D:
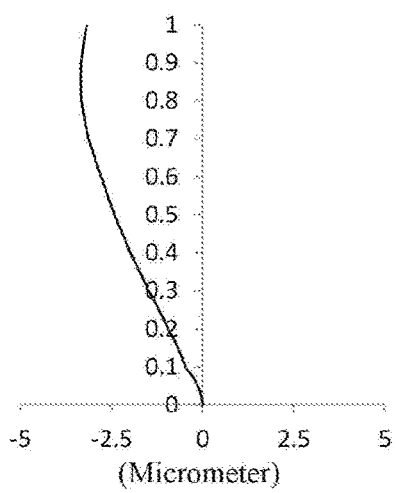

FIG. 16A illustrates a longitudinal aberration curve of the optical imaging lens assembly according to example 8, representing deviations of focal points converged by light of different wavelengths after passing through the optical imaging lens assembly. FIG. 16B illustrates an astigmatic curve of the optical imaging lens assembly according to example 8, representing a curvature of a tangential plane and a curvature of a sagittal plane. FIG. 16C illustrates a distortion curve of the optical imaging lens assembly according to example 8, representing amounts of distortion at different image heights. FIG. 16D illustrates a lateral color curve of the optical imaging lens assembly according to example 8, representing deviations of different image heights on an imaging plane after light passes through the optical imaging lens assembly. It can be seen from FIG. 16A to FIG. 16D that the optical imaging lens assembly provided in example 8 may achieve a good image quality.

Table 17 below shows effective focal lengths f1 to f5 of respective lens of the optical imaging lens assembly, a total effective focal length f of the optical imaging lens assembly, a total length TTL of the optical imaging lens assembly, half of a diagonal length ImgH of an effective pixel area on an imaging plane, half of a maximal field-of-view Semi-FOV of the optical imaging lens assembly, and an aperture value f/EPD of the optical imaging lens assembly described in above Examples 1-8.

TABLE 17

| Basic data | Example 1 | 2 | 3 | 4 | 5 | 6 | 7 | 8 |
|---|---|---|---|---|---|---|---|---|
| f1 (mm) | 11.17 | 8.48 | 8.81 | 10.37 | 8.85 | 8.94 | 9.17 | 9.29 |
| f2 (mm) | −5.30 | −1231.36 | −6.61 | −5.39 | −4.62 | −4.56 | −7.69 | −6.76 |
| f3 (mm) | 12.22 | −8.65 | 28.05 | 17.82 | 12.94 | 12.83 | −18.94 | −306.07 |
| f4 (mm) | −36.80 | −36.10 | −9.40 | −132.33 | −49.52 | −52.61 | 18.72 | 43.92 |
| f5 (mm) | 16.07 | 31.33 | 9.19 | 18.44 | 21.35 | 20.38 | 32.33 | 31.13 |
| f (mm) | 23.50 | 23.00 | 23.49 | 23.61 | 23.69 | 23.58 | 23.73 | 24.00 |

TABLE 17-continued

| Basic data | Example | | | | | | | |
|---|---|---|---|---|---|---|---|---|
| | 1 | 2 | 3 | 4 | 5 | 6 | 7 | 8 |
| TTL (mm) | 23.00 | 23.02 | 22.51 | 23.08 | 23.00 | 23.00 | 23.09 | 22.63 |
| ImgH (mm) | 4.20 | 4.30 | 4.25 | 4.27 | 4.28 | 4.25 | 4.29 | 4.33 |
| Semi-FOV | 10.1 | 10.4 | 10.2 | 10.2 | 10.2 | 10.2 | 10.2 | 10.2 |
| f/EPD | 3.09 | 3.41 | 3.09 | 3.11 | 3.12 | 3.10 | 3.12 | 3.16 |

Table 18 below shows the relevant parameters of the optical imaging lens assembly described in each example of the present disclosure.

TABLE 18

| Condition | Example | | | | | | | |
|---|---|---|---|---|---|---|---|---|
| | 1 | 2 | 3 | 4 | 5 | 6 | 7 | 8 |
| ET1/CT1 | 0.64 | 0.71 | 0.58 | 0.67 | 0.57 | 0.57 | 0.57 | 0.55 |
| TTL/f + tan(Semi-FOV) | 1.16 | 1.18 | 1.14 | 1.16 | 1.15 | 1.15 | 1.15 | 1.12 |
| f1/f | 0.48 | 0.37 | 0.38 | 0.44 | 0.37 | 0.38 | 0.39 | 0.39 |
| f23/f2345 | 0.58 | 0.90 | 0.81 | 0.55 | 0.70 | 0.67 | 0.44 | 0.57 |
| R1/f1 | 0.54 | 0.78 | 0.65 | 0.57 | 0.61 | 0.60 | 0.60 | 0.60 |
| R9/f5 | 0.31 | 0.14 | 0.55 | 0.27 | 0.27 | 0.28 | 0.40 | 0.22 |
| R3/(R3 − R1) | 0.58 | 0.58 | 0.59 | 0.58 | 0.57 | 0.57 | 0.49 | 0.52 |
| R6/|R5| | 1.71 | 0.77 | 1.40 | 1.40 | 1.67 | 1.68 | 0.60 | 0.89 |
| R10/f | 0.38 | 0.23 | 1.06 | 0.33 | 0.37 | 0.38 | 1.31 | 0.39 |
| CT4/(CT3 + CT5) | 0.65 | 0.46 | 0.46 | 0.78 | 0.61 | 0.61 | 0.81 | 0.61 |
| CT2/ΣAT | 0.36 | 0.85 | 0.35 | 0.43 | 0.40 | 0.40 | 0.32 | 0.34 |
| ET3/(ET3 + ET4) | 0.31 | 0.62 | 0.41 | 0.25 | 0.38 | 0.40 | 0.50 | 0.48 |
| (|SAG22| − SAG21)/DT22 | 0.32 | 0.25 | 0.34 | 0.32 | 0.33 | 0.33 | 0.26 | 0.28 |

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
   a first lens having a positive refractive power, and an object-side surface of the first lens being a convex surface;
   a second lens having a negative refractive power;
   a third lens having a refractive power;
   a fourth lens having a refractive power; and
   a fifth lens having a positive refractive power, and an image-side surface of the fifth lens being a concave surface; and
   wherein Semi-FOV<15°, where Semi-FOV is half of a maximal field-of-view of the optical imaging lens assembly; and
   wherein 1.4<R6/|R5|<2,
   where R5 is a radius of curvature of an object-side surface of the third lens and R6 is a radius of curvature of an image-side surface of the third lens
   wherein 0.2<R3/(R3-R1) <0.59,
   where R3 is a radius of curvature of an object-side surface of the second lens and R1 is a radius of curvature of the object-side surface of the first lens.

2. The optical imaging lens assembly according to claim 1, wherein TTL/f+tan(Semi-FOV)<1.2,
   where TTL is a distance along the optical axis from the object-side surface of the first lens to an imaging plane of the optical imaging lens assembly, f is a total effective focal length of the optical imaging lens assembly, and Semi-FOV is half of the maximal field-of-view of the optical imaging lens assembly.

3. The optical imaging lens assembly according to claim 1, wherein wherein 0.2<f1/f<0.7,
   where f1 is an effective focal length of the first lens and f is a total effective focal length of the optical imaging lens assembly.

4. The optical imaging lens assembly according to claim 1, wherein 0.2<f23/f2345<1.2,
   where f23 is a combined focal length of the second lens and the third lens and f2345 is a combined focal length of the second lens, the third lens, the fourth lens, and the fifth lens.

5. The optical imaging lens assembly according to claim 1, wherein $0.3 < R1/f1 < 0.8$,
where R1 is a radius of curvature of the object-side surface of the first lens and f1 is an effective focal length of the first lens.

6. The optical imaging lens assembly according to claim 1, wherein $0.1 < R9/f5 < 0.6$,
where R9 is a radius of curvature of an object-side surface of the fifth lens and f5 is an effective focal length of the fifth lens.

7. The optical imaging lens assembly according to claim 1, wherein $0.4 < CT4/(CT3-CT5) < 0.9$,
where CT3 is a center thickness of the third lens along the optical axis, CT4 is a center thickness of the fourth lens along the optical axis, and CT5 is a center thickness of the fifth lens along the optical axis.

8. The optical imaging lens assembly according to claim 1, wherein $0.5 < R10/f < 1.7$,
where R10 is a radius of curvature of an object-side surface of the fifth lens and f is a total effective focal length of the optical imaging lens assembly.

9. The optical imaging lens assembly according to claim 7, wherein $0.78 < CT4/(CT3+CT5) < 0.9$.

10. An optical imaging lens assembly according to claim 1,
wherein $0.3 < ET1/CT1 < 1$, where CT1 is a center thickness of the first lens along the optical axis and ET1 is an edge thickness of the first lens.

11. The optical imaging lens assembly according to claim 10, wherein $TTL/f + \tan(\text{Semi-FOV}) < 1.2$,
where TTL is a distance along the optical axis from the object-side surface of the first lens to an imaging plane of the optical imaging lens assembly, f is a total effective focal length of the optical imaging lens assembly, and Semi-FOV is half of a maximal field-of-view of the optical imaging lens assembly.

12. The optical imaging lens assembly according to claim 10, wherein $0.2 < f1/f < 0.7$,
where f1 is an effective focal length of the first lens and f is a total effective focal length of the optical imaging lens assembly.

13. The optical imaging lens assembly according to claim 10, wherein $0.2 < f23/f2345 < 1.2$,
where f23 is a combined focal length of the second lens and the third lens and f2345 is a combined focal length of the second lens, the third lens, the fourth lens, and the fifth lens.

14. The optical imaging lens assembly according to claim 10, wherein $0.3 < R1/f1 < 0.8$,
where R1 is a radius of curvature of the object-side surface of the first lens and f1 is an effective focal length of the first lens.

15. The optical imaging lens assembly according to claim 10, wherein $0.4 < CT4/(CT3+CT5) < 0.9$,
where CT3 is a center thickness of the third lens along the optical axis, CT4 is a center thickness of the fourth lens along the optical axis, and CT5 is a center thickness of the fifth lens along the optical axis.

16. The optical imaging lens assembly according to claim 10, wherein $0.3 < CT2/\Sigma T < 0.9$,
where CT2 is a center thickness of the second lens along the optical axis and $\Sigma AT$ is a sum of the air intervals along the optical axis of each two adjacent lenses of the first lens to the fifth lens.

17. The optical imaging lens assembly according to claim 10, wherein $0.2 < ET3/(ET3+ET4) < 0.7$,
where ET3 is an edge thickness of the third lens and ET4 is an edge thickness of the fourth lens.

18. The optical imaging lens assembly according to claim 10, wherein $0.1 < (|SAG22| - SAG21)/DT22 < 0.6$,
where SAG21 is a projection distance along the optical axis between an intersection of an object-side surface of the second lens and the optical axis and an apex of an effective radius of the object-side surface of the second lens, SAG22 is a projection distance along the optical axis between an intersection of an image-side surface of the second lens and the optical axis and an apex of an effective radius of the image-side surface of the second lens, and DT22 is a maximum effective radius of the image-side surface of the second lens.

19. An electronic device, comprising the optical lens assembly according to claim 1.

* * * * *